US012707464B2

(12) United States Patent
Zhang

(10) Patent No.: US 12,707,464 B2
(45) Date of Patent: Aug. 11, 2026

(54) COMMUNICATION METHOD, APPARATUS, AND SYSTEM

(71) Applicant: HUAWEI TECHNOLOGIES CO., LTD., Shenzhen (CN)

(72) Inventor: Lili Zhang, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 508 days.

(21) Appl. No.: 17/987,683

(22) Filed: Nov. 15, 2022

(65) Prior Publication Data

US 2023/0074206 A1 Mar. 9, 2023

Related U.S. Application Data

(63) Continuation of application No. PCT/CN2021/093885, filed on May 14, 2021.

(30) Foreign Application Priority Data

May 15, 2020 (CN) ......................... 202010415430.5

(51) Int. Cl.
*H04W 72/00* (2023.01)
*H04L 1/1829* (2023.01)
(Continued)

(52) U.S. Cl.
CPC ........... *H04W 72/20* (2023.01); *H04L 1/1851* (2013.01); *H04W 72/0446* (2013.01)

(58) Field of Classification Search
None
See application file for complete search history.

(56) References Cited

U.S. PATENT DOCUMENTS

2010/0232331 A1 9/2010 Son et al.
2019/0158229 A1 5/2019 Wei et al.
(Continued)

FOREIGN PATENT DOCUMENTS

CN 106165510 A 11/2016
CN 111096026 A 5/2020
CN 107211362 B 12/2020

OTHER PUBLICATIONS

Intel Corporation, "SUL and AUL coexistence," 3GPP TSG-RAN WG2 Meeting #101bis, Sanya, China, R2-1804895, Total 4 pages, 3rd Generation Partnership Project, Valbonne, France (Apr. 16-20, 2018).

(Continued)

*Primary Examiner* — Brandon M Renner
(74) *Attorney, Agent, or Firm* — Leydig, Voit & Mayer, Ltd.

(57) ABSTRACT

A communication method applied by a first terminal and a second terminal. The method includes: by a first terminal, starting a first timer after sending feedback information to a second terminal. The first timer indicates to the first terminal that the first terminal should not listen to sidelink control information and/or sidelink data information in at least one time unit after the first timer is started. In other words, within a start duration of the first timer, the second terminal does not send the sidelink control information and/or the sidelink data information to the first terminal. Therefore, the first terminal does not need to listen to the sidelink control information and/or the sidelink data information within the duration of the first unit. This can save energy within the first terminal.

17 Claims, 7 Drawing Sheets

(51) Int. Cl.
*H04W 72/0446* (2023.01)
*H04W 72/20* (2023.01)

(56) References Cited

U.S. PATENT DOCUMENTS

| | | | | |
|---|---|---|---|---|
| 2022/0217740 | A1 | 7/2022 | Park et al. | |
| 2022/0353945 | A1* | 11/2022 | Liu | H04W 76/28 |
| 2023/0055280 | A1* | 2/2023 | Hwang | H04W 72/20 |
| 2023/0115633 | A1* | 4/2023 | Park | H04W 72/0446 370/311 |
| 2023/0209644 | A1* | 6/2023 | Han | H04W 52/0274 370/328 |
| 2024/0064855 | A1* | 2/2024 | Wu | H04W 72/25 |

OTHER PUBLICATIONS

LG Electronics Inc. (Rapporteur), "Remaining V2X Mac Issues," 3GPP TSG-RAN WG2 #109-e, Online, R2-2003524, Total 13 pages, 3rd Generation Partnership Project, Valbonne, France (Apr. 20-30, 2020).

Nokia Corporation et al., HARQ related DRX timers for CA, 3GPP TSG-RAN WG2 Meeting #71, Madrid, Spain, R2-104820, Total 1 page, 3rd Generation Partnership Project, Valbonne, France (Aug. 23-27, 2010).

"3rd Generation Partnership Project; Technical Specification Group Radio Access Network; NR; Multiplexing and channel coding (Release 16)," 3GPP TS 38.212 V16.1.0, 3rd Generation Partnership Project, Valbonne, France, Total 146 pages (Mar. 2020).

"3rd Generation Partnership Project; Technical Specification Group Radio Access Network; NR; Physical layer procedures for control (Release 16)," 3GPP TS 38.213 V16.1.0, Total 156 pages, 3rd Generation Partnership Project, Valbonne, France (Mar. 2020).

"3rd Generation Partnership Project; Technical Specification Group Radio Access Network; NR; Physical layer procedures for data (Release 16)," 3GPP TS 38.214 V16.1.0 (Mar. 2020-03), Total 151 pages, 3rd Generation Partnership Project, Valbonne, France (Mar. 2020).

"3rd Generation Partnership Project; Technical Specification Group Radio Access Network; NR; Medium Access Control (MAC) protocol specification (Release 16)," 3GPP TS 38.321 V16.0.0, Total 141 pages, 3rd Generation Partnership Project, Valbonne, France (Mar. 2020).

"3rd Generation Partnership Project; Technical Specification Group Radio Access Network; NR; Radio Resource Control (RRC) protocol specification (Release 16)," 3GPP TS 38.331 V16.0.0, Total 834 pages, 3rd Generation Partnership Project, Valbonne, France (Mar. 2020).

* cited by examiner

Cycle

TB1

Retransmitted data

TB2

Detect initial SCI

Start a first timer

Start a second timer

Cycle

TB1

TB1

HARQ

Retransmitted data

TB2

Detect initial SCI

Start a first timer

Start a second timer

COMMUNICATION METHOD, APPARATUS, AND SYSTEM

CROSS-REFERENCE TO RELATED APPLICATIONS

This application is a continuation of International Application No. PCT/CN2021/093885, filed on May 14, 2021, which claims priority to Chinese Patent Application No. 202010415430.5, filed on May 15, 2020. The disclosures of the aforementioned applications are incorporated herein by reference in their entireties.

FIELD

Embodiments of this application relate to the field of communication technologies, and in particular, to a communication method, apparatus, and system.

BACKGROUND

In device to device (Device to Device, D2D) communication, a sidelink resource is a resource used for communication between terminals. The sidelink resource may include a frequency-domain sidelink resource and a time-domain sidelink resource.

Currently, a terminal on a sidelink, such as a wearable device, is sensitive to power consumption. How to reduce power consumption of the terminal becomes an urgent problem to be resolved.

SUMMARY

Embodiments of this application provide a communication method, apparatus, and system, to reduce power consumption of a terminal.

According to a first aspect, an embodiment of this application provides a communication method, including: A first terminal receives sidelink control information SCI from a second terminal, where the SCI indicates a time domain resource of a sidelink; and the first terminal starts a first timer at a first moment or a second moment. The first moment is associated with a time domain resource that is of a sidelink and that is occupied or indicated by the SCI. The second moment is associated with a time domain resource occupied by feedback information sent by the first terminal. The feedback information includes a measurement report of the sidelink, channel state information CSI of the sidelink, or hybrid automatic repeat request HARQ information of the sidelink. The first timer indicates not to listen to the sidelink control information and/or sidelink data information in at least one time unit after the first timer is started.

Based on the foregoing solution, the first terminal starts the first timer after sending the feedback information to the second terminal. The first timer indicates not to listen to the sidelink control information and/or the sidelink data information in the at least one time unit after the first timer is started. In other words, within start duration of the first timer, the second terminal does not send the sidelink control information and/or the sidelink data information to the first terminal. Therefore, the first terminal does not need to listen to the sidelink control information and/or the sidelink data information within the duration. This can save energy.

In a possible implementation, the first terminal stops the first timer at a third moment or a fourth moment. The third moment is obtained based on first duration. The fourth moment is associated with the time domain resource that is of the sidelink and that is indicated by the SCI.

In another possible implementation, when the first duration is met or when the first duration is exceeded, the first terminal stops the first timer.

The first duration described above is associated with latency that is of a time domain resource used for sidelink transmission and that is obtained by the second terminal, or is associated with the time domain resource that is of the sidelink and that is indicated by the SCI, or the first duration is configured for the first terminal by using signaling. The signaling is RRC signaling from a network device, or PC5 RRC signaling.

In a possible implementation, the first moment is any one of the following:

- a start symbol of the SCI;
- a next symbol of the start symbol of the SCI;
- an end symbol of the SCI;
- a next symbol of the end symbol of the SCI;
- a start symbol of a first time domain resource indicated by the SCI;
- a next symbol of the start symbol of the first time domain resource indicated by the SCI;
- an end symbol of the first time domain resource indicated by the SCI;
- a next symbol of the end symbol of the first time domain resource indicated by the SCI; and
- the end symbol of the first time domain resource indicated by the SCI plus a first offset.

Based on the foregoing solution, there may be a plurality of different implementation solutions for the first moment, and implementation is flexible.

In a possible implementation, the first offset is configured by using radio resource control RRC signaling, and the RRC signaling is PC5 RRC signaling or RRC signaling from a network device.

In a possible implementation, the second moment is any one of the following:

- an end moment of the feedback information;
- a next symbol of a symbol occupied by the feedback information;
- the symbol occupied by the feedback information plus a second offset;
- a next slot of the time domain resource occupied by the feedback information; and
- a next slot of a slot occupied by the feedback information.

Based on the foregoing solution, there may be a plurality of different implementation solutions for the second moment, and implementation is flexible.

In a possible implementation, the second offset is configured by using RRC signaling, and the RRC signaling is PC5 RRC signaling or RRC signaling from a network device.

In a possible implementation, the first duration is any one of the following:

T1, T2, T1+T3, T4, T1+T4, T2+T4, T1+T3+T4, T5, T5+T4, T5+T1, or T5+T1+T4.

T1 is duration used by the second terminal to complete a resource detection and selection process. T2 is duration used by the second terminal to identify a candidate resource and select a resource used for sidelink transmission. T3 is latency in processing the feedback information by the second terminal. T4 is a delay of a resource selection window of the second terminal relative to a resource detection window of the second terminal. T5 is duration in which the second terminal completes SCI decoding/parsing, or duration in which the second terminal completes SCI decoding/ parsing and performs reference signal received power RSRP/received signal strength indication RSSI measurement.

Based on the foregoing solution, there may be a plurality of different implementation solutions for second duration, and implementation is flexible.

In a possible implementation, the time domain resource that is of the sidelink and that is indicated by the SCI includes a first resource set. The first resource set includes time domain resources of N sidelinks. N is a positive integer. The fourth moment is a fifth moment, the fifth moment plus a third offset, a sum of the first moment and duration corresponding to a first difference, or a sum of the second moment and duration corresponding to a second difference. The first difference is a difference between the first moment and the fifth moment. The second difference is a difference between the second moment and the fifth moment. The fifth moment is any one of the following:

- a start symbol of an $x^{th}$ time domain resource that is in the first resource set and that is indicated by the SCI;
- a next symbol of the start symbol of the $x^{th}$ time domain resource that is in the first resource set and that is indicated by the SCI;
- an end symbol of the $x^{th}$ time domain resource that is in the first resource set and that is indicated by the SCI; and
- a next symbol of the end symbol of the $x^{th}$ time domain resource that is in the first resource set and that is indicated by the SCI.

x is an integer less than or equal to N and greater than 1.

Based on the foregoing solution, there may be a plurality of different implementation solutions for the fourth moment, and implementation is flexible.

In a possible implementation, the time domain resource that is of the sidelink and that is indicated by the SCI includes a second resource set. The second resource set includes a periodic first resource set. The first resource set includes time domain resources of N sidelinks. N is a positive integer. The fourth moment is a sixth moment, the sixth moment plus a fourth offset, a sum of the first moment and duration corresponding to a third difference, or a sum of the second moment and duration corresponding to a fourth difference. The third difference is a difference between the first moment and the sixth moment. The fourth difference is a difference between the second moment and the sixth moment. The sixth moment is any one of the following:

- a start symbol of a $z^{th}$ time domain resource that is in a $y^{th}$ first resource set in the second resource set and that is indicated by the SCI;
- a next symbol of the start symbol of the $z^{th}$ time domain resource that is in the $y^{th}$ first resource set in the second resource set and that is indicated by the SCI;
- an end symbol of the $z^{th}$ time domain resource that is in the $y^{th}$ first resource set in the second resource set and that is indicated by the SCI; and
- a next symbol of the end symbol of the $z^{th}$ time domain resource that is in the $y^{th}$ first resource set in the second resource set and that is indicated by the SCI.

y is a positive integer, and z is a positive integer less than or equal to N.

Based on the foregoing solution, there may be a plurality of different implementation solutions for the fourth moment, and implementation is flexible.

In a possible implementation, the SCI includes first-level SCI and second-level SCI. The first moment is any one of the following:

- a start symbol of the first-level SCI or a start symbol of the second-level SCI;
- a next symbol of the start symbol of the first-level SCI or a next symbol of the start symbol of the second-level SCI;
- an end symbol of the first-level SCI or an end symbol of the second-level SCI;
- a next symbol of the end symbol of the first-level SCI or a next symbol of the end symbol of the second-level SCI;
- a start symbol of a first time domain resource indicated by the first-level SCI;
- a next symbol of the start symbol of the first time domain resource indicated by the first-level SCI;
- an end symbol of the first time domain resource indicated by the first-level SCI; and
- a next symbol of the end symbol of the first time domain resource indicated by the first-level SCI.

Based on the foregoing solution, there may be a plurality of different implementation solutions for the first moment, and implementation is flexible.

In a possible implementation, the first-level SCI indicates a first resource set. The first resource set includes time domain resources of N sidelinks. N is a positive integer. The fourth moment is any one of the following:

- a start symbol of an $x^{th}$ time domain resource in the first resource set;
- a next symbol of the start symbol of the $x^{th}$ time domain resource in the first resource set;
- an end symbol of the $x^{th}$ time domain resource in the first resource set; and
- a next symbol of the end symbol of the $x^{th}$ time domain resource in the first resource set.

x is an integer less than or equal to N and greater than 1.

Based on the foregoing solution, there may be a plurality of different implementation solutions for the fourth moment, and implementation is flexible.

In a possible implementation, the first-level SCI indicates a second resource set. The second resource set includes a periodic first resource set. The first resource set includes time domain resources of N sidelinks. N is a positive integer. The fourth moment is any one of the following:

- a start symbol of a $z^{th}$ time domain resource in a $y^{th}$ first resource set in the second resource set;
- a next symbol of the start symbol of the $z^{th}$ time domain resource in the $y^{th}$ first resource set in the second resource set;
- an end symbol of the $z^{th}$ time domain resource in the $y^{th}$ first resource set in the second resource set; and
- a next symbol of the end symbol of the $z^{th}$ time domain resource in the $y^{th}$ first resource set in the second resource set, where y is a positive integer, and z is a positive integer less than or equal to N.

Based on the foregoing solution, there may be a plurality of different implementation solutions for the fourth moment, and implementation is flexible.

In a possible implementation, the first terminal starts a second timer at a seventh moment. The seventh moment is a stop moment of the first timer or a first symbol after the stop moment of the first timer.

In a possible implementation, the first terminal stops the second timer at an eighth moment. The eighth moment is obtained based on the second duration.

In another possible implementation, when the second duration is met or when the second duration is exceeded, the first terminal stops the second timer.

The second duration described above is a duration value associated with duration of the resource selection window, or is a duration value associated with duration of resource selection/reselection, or the second duration is configured for the first terminal by using signaling. The signaling is RRC signaling from a network device, or PC5 RRC signaling.

In a possible implementation, the feedback information is the measurement report of the sidelink or the CSI of the sidelink, and the second timer indicates a time period for listening to the sidelink control information and/or the sidelink data information.

In a possible implementation, the feedback information is the HARQ information, and the second timer indicates a time period for listening to retransmitted data on the sidelink.

Based on the foregoing solution, the first terminal may start to listen to the sidelink control information and/or the sidelink data information or listen to the retransmitted data on the sidelink only within a start time of the second timer. On the one hand, it can be ensured that the first terminal can listen to the sidelink control information and/or the sidelink data information or listen to the retransmitted data on the sidelink in the corresponding time period. On the other hand, because the time period for listening is set, severe power consumption caused by blind listening can be avoided, and therefore energy can be saved.

In a possible implementation, the first terminal determines that the first terminal is in an active period in a first time period. The first time period is a time period in which an active period indicated by a third timer overlaps duration of the first timer. The third timer is any timer other than the first timer.

That is, if it is indicated that the first terminal is not in the active period within the duration of the first timer, but the third timer indicates that the first terminal is in the active period in the first time period of the first timer, a union set of active periods indicated by the two timers is used as the active period of the first terminal.

In a possible implementation, the first terminal determines that the first terminal is in the active period in a second time period. The second time period is a union set of duration of the second timer and the active period indicated by the third timer. The third timer is any timer other than the first timer.

That is, if it indicates that the first terminal is in the active period within the duration of the second timer, and the third timer indicates that the first terminal is in the active period in a time period, a union set of active periods indicated by the two timers is used as the active period of the first terminal.

According to a second aspect, an embodiment of this application provides a communication method, including: A second terminal sends sidelink control information SCI to a first terminal, where the SCI indicates a time domain resource of a sidelink; and the second terminal starts a first timer at a first moment. The first moment is associated with a time domain resource that is of a sidelink and that is occupied or indicated by the SCI. The first timer indicates not to listen to feedback information in at least one time unit after the first timer is started. The feedback information includes a measurement report of the sidelink, channel state information CSI of the sidelink, or hybrid automatic repeat request HARQ information of the sidelink.

Based on the foregoing solution, the second terminal starts the first timer after sending the SCI to the first terminal. The first timer indicates not to listen to, in the at least one time unit after the first timer is started, the feedback information sent by the first terminal. In other words, within start duration of the first timer, the first terminal does not send the feedback information to the second terminal. Therefore, the second terminal does not need to listen to the feedback information within the duration. This can save energy.

In a possible implementation, the second terminal stops the first timer at a second moment. The second moment is associated with a time domain resource occupied by the feedback information sent by the first terminal.

In another possible implementation, when the first duration is met or when the first duration is exceeded, the second terminal stops the first timer. The first duration is associated with a time domain position in which the feedback information is sent, or the first duration is configured for the second terminal by using signaling. The signaling is RRC signaling from a network device, or PC5 RRC signaling. The first duration being exceeded may be understood as that the time exceeds the first duration since or after the first timer is started.

In a possible implementation, the first moment is any one of the following:

- a start symbol of the SCI;
- a next symbol of the start symbol of the SCI;
- an end symbol of the SCI;
- a next symbol of the end symbol of the SCI;
- a start symbol of a first time domain resource indicated by the SCI;
- a next symbol of the start symbol of the first time domain resource indicated by the SCI;
- an end symbol of the first time domain resource indicated by the SCI;
- a next symbol of the end symbol of the first time domain resource indicated by the SCI; and
- the end symbol of the first time domain resource indicated by the SCI plus a first offset.

Based on the foregoing solution, there may be a plurality of different implementation solutions for the first moment, and implementation is flexible.

In a possible implementation, the first offset is configured by using radio resource control RRC signaling, and the RRC signaling is PC5 RRC signaling or RRC signaling from a network device.

In a possible implementation, the second moment is any one of the following:

- a start moment of the feedback information;
- a previous symbol of a symbol occupied by the feedback information;
- the symbol occupied by the feedback information minus a second offset;
- a previous slot of the time domain resource occupied by the feedback information; and
- a previous slot of a slot occupied by the feedback information.

Based on the foregoing solution, there may be a plurality of different implementation solutions for the second moment, and implementation is flexible.

In a possible implementation, the second offset is configured by using RRC signaling, and the RRC signaling is PC5 RRC signaling or RRC signaling from a network device.

In a possible implementation, the second terminal starts a second timer at a third moment. The third moment is a stop moment of the first timer or a first symbol after the stop moment of the first timer. The second timer indicates a time period for listening to the feedback information.

Based on the foregoing solution, the second terminal may start to listen to the feedback information only within a start time of the second timer. On the one hand, it can be ensured that the second terminal can obtain the feedback information through listening in the corresponding time period. On the other hand, because the time period for listening is set, severe power consumption caused by blind listening can be avoided, and therefore energy can be saved.

In a possible implementation, the second terminal stops the second timer at a fourth moment. The fourth moment is a value preconfigured or predefined by the network device or the second terminal.

In another implementation, when the second duration is met or when the second duration is exceeded, the second terminal stops the second timer.

The second duration is associated with duration occupied by the feedback information, or the second duration is configured for the second terminal by using signaling. The signaling is RRC signaling from a network device, or PC5 RRC signaling. The second duration being exceeded may be understood as that the time exceeds the second duration since or after the second timer is started.

In a possible implementation, the second terminal determines that the second terminal is in an active period in a first time period. The first time period is a time period in which an active period indicated by a third timer overlaps duration of the first timer. The third timer is any timer other than the first timer.

That is, if it is indicated that the second terminal is not in the active period within the duration of the first timer, but the third timer indicates that the second terminal is in the active period in the first time period of the first timer, a union set of active periods indicated by the two timers is used as the active period of the second terminal.

In a possible implementation, the second terminal determines that the second terminal is in the active period in a second time period. The second time period is a union set of duration of the second timer and the active period indicated by the third timer. The third timer is any timer other than the first timer.

That is, if it indicates that the second terminal is in the active period within the duration of the second timer, and the third timer indicates that the second terminal is in the active period in a time period, a union set of active periods indicated by the two timers is used as the active period of the second terminal.

According to a third aspect, an embodiment of this application provides a communication method, including: A first terminal receives SCI from a second terminal, where the SCI indicates a time domain resource of a sidelink; and the first terminal starts a first timer at a first moment. The first moment is associated with a time domain resource that is of a sidelink and that is occupied or indicated by the SCI. A second moment is associated with a time domain resource occupied by feedback information sent by the first terminal. The feedback information includes a measurement report of the sidelink, CSI of the sidelink, or HARQ information of the sidelink. The first timer indicates not to listen to the sidelink control information and/or sidelink data information in at least one time unit after the first timer is started. When a channel congestion rate is greater than a channel congestion rate threshold and/or a priority value in the SCI is less than a priority threshold, the first terminal stops the first timer at a third moment or a fourth moment. The third moment is a start moment of a next resource cycle. The fourth moment is associated with the time domain resource that is of the sidelink and that is indicated by the SCI.

Based on the foregoing solution, considering that when a channel is congested, even if the first terminal sends NACK feedback information to the second terminal, the second terminal may not detect a new resource used for retransmitting data because the channel is congested. Therefore, the second terminal cannot reallocate a resource to retransmit the data. In this case, a resource in a next cycle may be used for retransmitting the data. This can save energy for the first terminal as much as possible.

In a possible implementation, the first terminal starts a second timer at a fifth moment. The fifth moment is a stop moment of the first timer or a first symbol after the stop moment of the first timer.

In a possible implementation, the first terminal stops the second timer at a sixth moment. The sixth moment is obtained based on second duration. The second duration is configured by using RRC signaling, or is a duration value associated with duration of a resource selection window, or is a duration value associated with duration of resource selection/reselection.

According to a fourth aspect, an embodiment of this application provides a communication apparatus. The apparatus may be a first terminal, or may be a chip used for the first terminal. The apparatus has a function of implementing the first aspect, the third aspect, the possible implementations of the first aspect, or the possible implementations of the third aspect. The function may be implemented by hardware, or may be implemented by hardware executing corresponding software. The hardware or the software includes one or more modules corresponding to the function.

According to a fifth aspect, an embodiment of this application provides a communication apparatus. The apparatus may be a second terminal, or may be a chip used for the second terminal. The apparatus has a function of implementing the second aspect or the possible implementations of the second aspect. The function may be implemented by hardware, or may be implemented by hardware executing corresponding software. The hardware or the software includes one or more modules corresponding to the function.

According to a sixth aspect, an embodiment of this application provides a communication apparatus, including a processor and a memory. The memory is configured to store computer-executable instructions. When the apparatus runs, the processor executes the computer-executable instructions stored in the memory, to enable the apparatus to perform any method in the methods according to the first aspect to the third aspect or the possible implementations of the first aspect to the third aspect.

According to a seventh aspect, an embodiment of this application provides a communication apparatus, including units or means (means) configured to perform the steps of any method in the methods according to the first aspect to the third aspect or the possible implementations of the first aspect to the third aspect.

According to an eighth aspect, an embodiment of this application provides a communication apparatus, including a processor and an interface circuit. The processor is configured to communicate with another apparatus by using the interface circuit, and perform any method in the methods according to the first aspect to the third aspect or the possible implementations of the first aspect to the third aspect. There are one or more processors.

According to a ninth aspect, an embodiment of this application provides a communication apparatus, including a processor, configured to connect to a memory, and invoke a program stored in the memory, to perform any method in the methods according to the first aspect to the third aspect or the possible implementations of the first aspect to the third aspect. The memory may be located inside or outside the apparatus. There are one or more processors.

According to a tenth aspect, an embodiment of this application further provides a computer-readable storage medium. The computer-readable storage medium stores instructions. When the instructions are on a computer, a processor is enabled to perform any method in the methods according to the first aspect to the third aspect or the possible implementations of the first aspect to the third aspect.

According to an eleventh aspect, an embodiment of this application further provides a computer program product. The computer product includes a computer program. When the computer program is run, any method in the methods according to the first aspect to the third aspect or the possible implementations of the first aspect to the third aspect is performed.

According to a twelfth aspect, an embodiment of this application further provides a chip system, including a processor, configured to perform any method in the methods according to the first aspect to the third aspect or the possible implementations of the first aspect to the third aspect.

According to a thirteenth aspect, an embodiment of this application further provides a communication system, including a first terminal and a second terminal. The second terminal is configured to send sidelink control information SCI to the first terminal. The SCI indicates a time domain resource of a sidelink. The first terminal is configured to receive the SCI from the second terminal, and start a first timer at a first moment or a second moment. The first moment is associated with a time domain resource that is of a sidelink and that is occupied or indicated by the SCI. The second moment is associated with a time domain resource occupied by feedback information sent by the first terminal. The feedback information includes a measurement report of the sidelink, channel state information CSI of the sidelink, or hybrid automatic repeat request HARQ information of the sidelink. The first timer indicates not to listen to the sidelink control information and/or sidelink data information in at least one time unit after the first timer is started.

According to a fourteenth aspect, an embodiment of this application further provides a communication method, including: A second terminal sends sidelink control information SCI to a first terminal, where the SCI indicates a time domain resource of a sidelink; the first terminal receives the SCI from the second terminal; and; and the first terminal starts a first timer at a first moment or a second moment. The first moment is associated with a time domain resource that is of a sidelink and that is occupied or indicated by the SCI. The second moment is associated with a time domain resource occupied by feedback information sent by the first terminal. The feedback information includes a measurement report of the sidelink, channel state information CSI of the sidelink, or hybrid automatic repeat request HARQ information of the sidelink. The first timer indicates not to listen to the sidelink control information and/or sidelink data information in at least one time unit after the first timer is started.

According to a fifteenth aspect, an embodiment of this application further provides a communication system, including a first terminal and a second terminal. The first terminal is configured to receive sidelink control information SCI from the second terminal. The SCI indicates a time domain resource of a sidelink. The second terminal is configured to send the SCI to the first terminal, and start a first timer at a first moment. The first moment is associated with a time domain resource that is of a sidelink and that is occupied or indicated by the SCI. The first timer indicates not to listen to feedback information in at least one time unit after the first timer is started. The feedback information includes a measurement report of the sidelink, channel state information CSI of the sidelink, or hybrid automatic repeat request HARQ information of the sidelink.

According to a sixteenth aspect, an embodiment of this application further provides a communication method, including: A first terminal receives sidelink control information SCI from a second terminal, where the SCI indicates a time domain resource of a sidelink; the second terminal sends the SCI to the first terminal; and the second terminal starts a first timer at a first moment. The first moment is associated with a time domain resource that is of a sidelink and that is occupied or indicated by the SCI. The first timer indicates not to listen to feedback information in at least one time unit after the first timer is started. The feedback information includes a measurement report of the sidelink, channel state information CSI of the sidelink, or hybrid automatic repeat request HARQ information of the sidelink.

DESCRIPTION OF EMBODIMENTS

Figure 1:
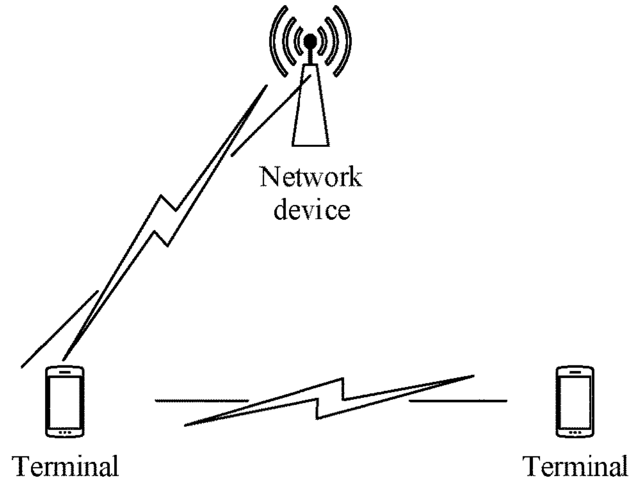
FIG. 1 is a schematic diagram of a network architecture, according to an embodiment of the present disclosure.

FIG. 1 is a schematic diagram of a network architecture to which an embodiment of this application is applicable. The network architecture includes at least two terminals and at least one network device. Optionally, the terminal may communicate with the network device through a wireless interface.

The terminal (terminal) is a device having a wireless transceiver function. The terminal may be deployed on land, and includes an indoor device, an outdoor device, a handheld device, or a vehicle-mounted device; or may be deployed on a water surface (for example, on a ship); or may be deployed in the air (for example, on an airplane, a balloon, or a satellite). The terminal may be a mobile phone (mobile phone), a tablet computer (pad), a computer having a wireless transceiver function, a virtual reality (virtual reality, VR) terminal, an augmented reality (augmented reality, AR) terminal, a wireless terminal in industrial control (industrial control), a wireless terminal in self driving (self driving), a wireless terminal in remote medical (remote medical), a wireless terminal in a smart grid (smart grid), a wireless terminal in transportation safety (transportation safety), a wireless terminal in a smart city (smart city), a wireless terminal in a smart home (smart home), user equipment (user equipment, UE), or the like. Direct communication is supported between terminals in this embodiment of this application, and direct communication between the terminals may also be referred to as D2D communication.

The network device is a device that provides a wireless communication function for a terminal. The network device includes but is not limited to a next generation NodeB (g nodeB, gNB) in fifth generation (5th generation, 5G), an evolved NodeB (evolved node B, eNB), a radio network controller (radio network controller, RNC), a NodeB (node B, NB), a base station controller (base station controller, BSC), a base transceiver station (base transceiver station, BTS), a home base station (for example, a home evolved nodeB, or a home node B, HNB), a baseband unit (baseBand unit, BBU), a transmission reception point (transmitting and receiving point, TRP), a transmission point (transmitting point, TP), or a mobile switching center.

When 5G is independently deployed, a logical system of the network device can use a mode in which a centralized unit (centralized unit, CU) is separated from a distributed unit (distributed unit, DU). Based on configuration of protocol stack functions, a CU-DU logical system may be classified into two types: a CU-DU split architecture and a CU-DU integrated architecture. For a CU-DU split architecture, the protocol stack functions may be dynamically configured and split. Some functions are implemented in a CU, and remaining functions are implemented in a DU. To meet requirements of different split options, ideal and non-ideal transmission networks need to be supported. An interface between the CU and the DU should comply with a 3rd generation partnership project (3rd generation partnership project, 3GPP) specification requirement. For a CU-DU integrated architecture, logical functions of a CU and a DU are integrated into a same network device, to implement all functions of a protocol stack.

For ease of understanding embodiments of this application, the following first describes technical terms involved in embodiments of this application. It should be noted that the following technical terms do not constitute a conventional technology of embodiments of this application, and descriptions of these technical terms also include embodiments of this application.

1. Discontinuous Reception (DRX) Mechanism

The DRX mechanism is introduced in Uu interface communication between a terminal and a network device, to save power of the terminal. In the DRX mechanism, a DRX cycle is configured for the terminal in a radio resource control (RRC) connected mode. The DRX cycle includes "On Duration (a wake-up period or a wake-up time or an active period or duration)" and "Opportunity for DRX (a sleep period or a sleep time)". During the "On Duration", the terminal listens to and receives a physical downlink control channel (PDCCH). During the "Opportunity for DRX", the terminal does not receive data from the PDCCH, to reduce power consumption. The wake-up period of the DRX cycle may be configured by notifying an onDurationTimer by using signaling.

Figure 2:
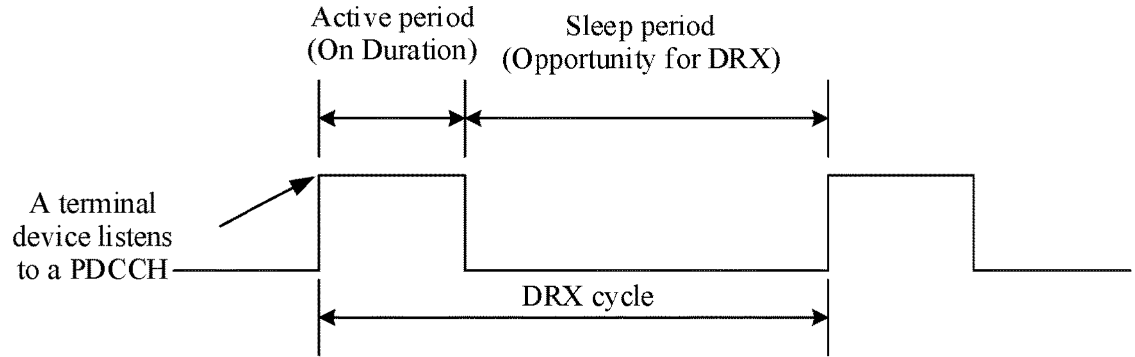
FIG. 2 is a schematic diagram of a DRX cycle, according to an embodiment of the present disclosure.

FIG. 2 is a schematic diagram of a DRX cycle. It can be learned from the figure that in time domain, a time is divided into continuous DRX cycles. drxStartOffset specifies a start subframe of the DRX cycle, and long DRX Cycle specifies a quantity of subframes occupied by a long DRX cycle. The two parameters are specified by a longDRX-CycleStartOffset field. An onDurationTimer timer specifies a quantity of continuous subframes (that is, a quantity of subframes that last in an active period) that need to be listened to on the PDCCH from the start subframe of the DRX cycle.

In most cases, after a terminal is scheduled in a subframe and receives or sends data, the terminal may be continuously scheduled in next several subframes. If the terminal needs to wait for a next DRX cycle to receive or send the data, an additional delay is caused. Therefore, to reduce such a delay, after being scheduled, the terminal is continuously in the active period, that is, continuously listens to the PDCCH in the configured active period. An implementation mechanism is as follows: Each time the terminal is scheduled to initially transmit data, a DRX inactivity timer (drxInactivity Timer) is started (or restarted or enabled), and the terminal is always in an active state until the timer expires. drxInactivity Timer specifies a quantity of continuous subframes that is always in the active state after the terminal successfully decodes a PDCCH indicating initially transmitted uplink (UL) or downlink (DL) user data. That is, the timer starts or restarts once each time the terminal has initially transmitted data to be scheduled. It should be noted that this is initial transmission instead of retransmission. Initial transmission is first transmission of a transport block (TB). Retransmission is retransmission of a same transport block after the first transmission. The retransmission may be performed multiple times.

In embodiments of the present disclosure, on duration in the DRX cycle belongs to the active period, and a working period of the timer after drxInactivity Timer is started also belongs to the active period.

Selecting the DXR cycle strikes a balance between battery saving and a delay. On one hand, a long DRX cycle helps prolong a battery use time of the terminal. For example, in web browsing, when a user reads a downloaded web page, a resource is wasted if the terminal continuously receives downlink data at this time. On the other hand, when new data is transmitted, a shorter DRX cycle facilitates a quicker response. For example, the terminal requests another web page or voice over internet protocol (VOIP).

In exemplary embodiments of the present disclosure, each terminal may be configured with two DRX cycles: a short DRX cycle and a long DRX cycle.

2. Sidelink Resource

In this embodiment of this application, the sidelink resource may also be referred to as a resource or a transmission resource for short. In this application, a sidelink may also be referred to as a side link, a bylink, a PC5 interface link, or a link between terminals.

In D2D communication, the sidelink resource is a resource used for communication between terminals. The sidelink resource may include a sidelink resource in frequency domain and a sidelink resource in time domain. This application mainly discusses a time-domain sidelink resource in a frequency-domain sidelink resource and a time-domain sidelink resource. Subsequent sidelink resources may be all time-domain sidelink resources. A unified description is provided herein.

From a perspective of a transmission type, the sidelink resource may include a sidelink sending resource and a sidelink receiving resource. The sidelink sending resource is used for sending information, for example, sending sidelink control information and/or sidelink data information. The sidelink receiving resource is used for receiving information, for example, receiving sidelink control information and/or sidelink data information.

Currently, there are two methods for selecting a sidelink resource. In a first method, a network device allocates a resource to a sidelink. In a second method, a terminal at a transmit end selects a reserved sidelink resource from an idle resource, and sends sidelink control information (SCI) to a terminal at a receive end. The SCI carries information indicating the reserved sidelink resource. Each time SCI is sent, a maximum of N resources (N is a positive integer) may be reserved, and resources reserved in a same piece of SCI are used for transmitting a same data packet or a same transport block. Alternatively, resources reserved in a same piece of SCI may be a first resource to an $x^{th}$ resource that are used for transmitting one data packet or one transport block, and an $(X+1)^{th}$ resource to an Nth resource that are used for transmitting another data packet or another transport block. X is a positive integer greater than or equal to 1 and less than or equal to N. Certainly, the $(X+1)^{th}$ resource to the Nth resource may also be used for transmitting a plurality of other data packets or a plurality of other transport blocks. The rest can be deduced by analogy, and examples are not enumerated herein. Optionally, N is 3 or any integer greater than 3. Optionally, this is an aperiodic reserved resource. Optionally, the SCI may further carry a period value, and N resources reserved in one piece of SCI may be repeatedly reserved based on the period value.

It should be noted that resources reserved in different periods are used for transmitting different transport blocks. For example, N resources in a first period are used for transmitting a transport block 1, N resources in a second period are used for transmitting a transport block 2, N resources in a third period are used for transmitting a transport block 3. The rest may be deduced by analogy.

Figure 3:
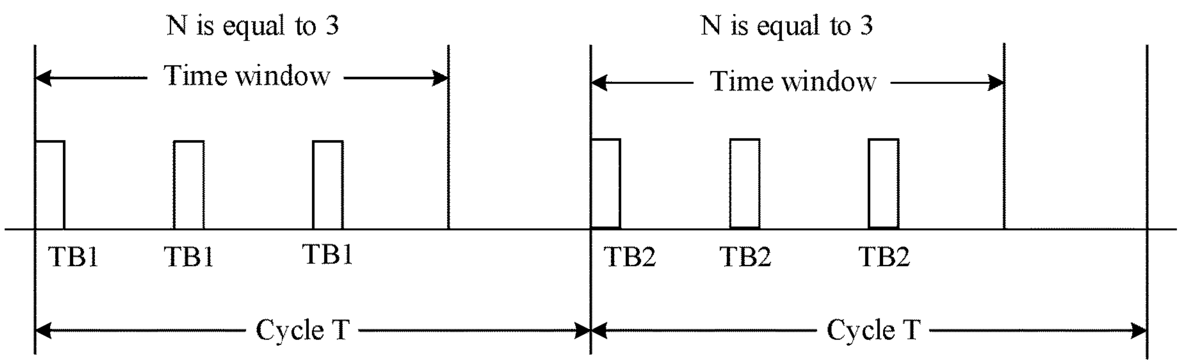
FIG. 3 is a schematic diagram of a reserved sidelink resource, according to an embodiment of the present disclosure.

FIG. 3 is a schematic diagram of a reserved sidelink resource. There are three reserved sidelink resources in each period. A sidelink resource reserved in a first period is used for transmitting a transport block 1 (TB1), and a sidelink resource reserved in a second period is used for transmitting a transport block 2 (TB2). It should be noted that all sidelink resources reserved in each period need to be limited to one time window. That is, the reserved sidelink resources cannot exceed the time window.

In this embodiment of this application, a transport block may also be referred to as a data packet.

In this embodiment of this application, a terminal on a receiver side may send feedback information to a terminal on a transmitter side. The feedback information may be a measurement report of a sidelink, channel state information (CSI) of the sidelink, or hybrid automatic repeat request (HARQ) information of the sidelink. The measurement report of the sidelink may be reference signal received power (RSRP) of the sidelink, reference signal received quality (RSRQ) of the sidelink, a received signal strength indication (RSSI) of the sidelink, radio link monitoring (RLM) information of the sidelink, or the like.

In this embodiment of this application, positions of a time domain resource and/or a frequency domain resource occupied by the feedback information may be configured by the terminal on the transmitter side for the terminal on the receiver side, or may be configured by a network device for the terminal on the receiver side. When the network device configures, for the terminal on the receiver side, the positions of the time domain resource and/or the frequency domain resource occupied by the feedback information, the network device further notifies the terminal on the transmitter side of the configured positions of the time domain resource and/or the frequency domain resource occupied by the feedback information. Certainly, the positions of the time domain resource and/or the frequency domain resource occupied by the feedback information may alternatively be obtained by the terminal on the receiver side through resource detection, or may be obtained through resource detection based on the positions of the time domain resource and/or the frequency domain resource occupied by the feedback information configured by the network device.

In this embodiment of this application, a position of a time domain resource on which sent feedback information for the transport block 1 is located is a resource on which the transport block 1 is located or a moment at which feedback can be performed after the transport block 1. Optionally, when the feedback information is the HARQ, the moment at which the feedback may be performed subsequently is the resource on which the transport block 1 is located or a position of a time domain resource on which the configured feedback information that is greater than a minimum HARQ processing time (for example, greater than MinTimeGapPSFCH) and that is after the transport block 1 is located. Optionally, when the feedback information is the CSI, the moment at which the feedback may be performed subsequently is the resource on which the transport block 1 is located or the position of the time domain resource on which the configured feedback information that is greater than a minimum CSI generation time (for example, greater than MinTimeGapCSI) and that is after the transport block 1 is located.

In this embodiment of this application, when the feedback information sent by the terminal on the receiver side to the terminal on the transmitter side is the measurement report of the sidelink or the CSI of the sidelink, after receiving the feedback information, the terminal on the transmitter side obtains information such as channel quality and a channel state based on the feedback information, so as to send sidelink control information and/or sidelink data information to the terminal on the receiver side based on the feedback information.

In this embodiment of this application, when the feedback information sent by the terminal on the receiver side to the terminal on the transmitter side is the HARQ information, after the terminal on the transmitter side receives the feedback information, if an acknowledgment (ACK) is fed back by the feedback information, it indicates that data sent by the terminal on the transmitter side on a previous reserved sidelink resource is correctly received and parsed by the terminal on the receiver side. Therefore, the terminal on the transmitter side can continue to send a next piece of data on a next reserved sidelink resource. If a negative acknowledgment (NACK) is fed back by the feedback information, it indicates that data sent by the terminal on the transmitter side on a previous reserved sidelink resource or on a sidelink resource that is reserved earlier is not correctly received or parsed by the terminal on the receiver side. Therefore, the terminal on the transmitter side can retransmit the data on a next reserved sidelink resource or on a sidelink resource reallocated to the terminal on the transmitter side. Optionally, the reallocation may be understood as any one of selection, reselection, detection and selection, or detection and reselection.

Figure 4:
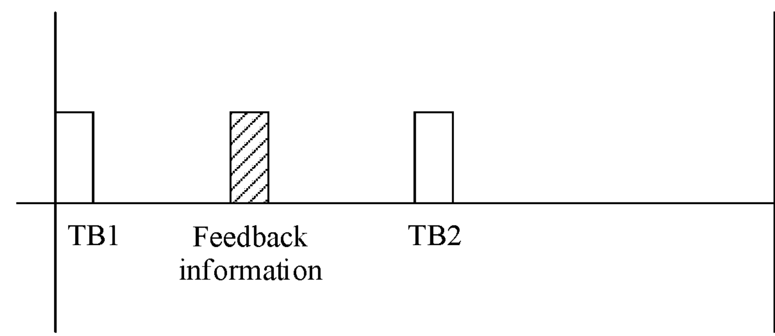
FIG. 4 is an example of feedback information, according to an embodiment of the present disclosure.

FIG. 4 is an example of feedback information according to an embodiment of this application. A terminal on a transmitter side reserves two sidelink resources for a terminal on a receiver side. The two sidelink resources are respectively referred to as a resource 1 and a resource 2. The resource 1 is used for transmitting a "transport block 1 (TB1)", and the resource 2 is used for transmitting a "transport block 2 (TB2)". A time-frequency resource location occupied by the feedback information in the figure is preconfigured by a network device or the terminal on the transmitter side.

In an example, if the feedback information in FIG. 4 is a measurement report of a sidelink or CSI of the sidelink, the terminal on the transmitter side sends sidelink control information and/or sidelink data information to the terminal on the receiver side on the resource 2 based on the feedback information. In embodiments of the present disclosure, a resource corresponding to a transport block j may also be referred to as a resource in which the transport block j is located, or a resource used for transmitting the transport block j, where j is 1, 2, or . . . .

In still another example, the terminal on the transmitter side sends data 1 to the terminal on the receiver side on the resource 1. The feedback information in FIG. 4 is HARQ information that is for the transport block 1 and that is sent by the terminal on the receiver side to the terminal on the transmitter side. When the HARQ information is an ACK, after receiving the ACK, the terminal on the transmitter side continues to send next data, for example, data 2, to the terminal on the receiver side on the resource 2. Optionally, after receiving the ACK, the terminal on the transmitter side may also release the resource 2. When the HARQ information is a NACK, after receiving the NACK, the terminal on the transmitter side learns that the terminal on the receiver side does not correctly receive or parse the data 1, and continues to retransmit the data 1 to the terminal on the receiver side on the resource 2.

Based on the foregoing feedback mechanism, after sending the sidelink control information and/or data information to the terminal on the receiver side on the reserved sidelink resource, the terminal on the transmitter side needs to keep listening to the feedback information sent by the terminal on the receiver side. If the terminal on the transmitter side immediately starts to listen to the feedback information after completing sending the sidelink control information and/or data information until the feedback information is obtained through listening, the terminal on the transmitter side is always in an active period. Consequently, the terminal on the transmitter side consumes a large amount of power, and the terminal is unable to save current energy.

Based on the foregoing feedback mechanism, after sending the feedback information to the terminal on the transmitter side, the terminal on the receiver side needs to keep listening to sidelink control information and/or sidelink data information (which may be initially transmitted data or retransmitted data) to be sent by the terminal on the transmitter side. If the terminal on the receiver side immediately starts to listen to the sidelink control information and/or the sidelink data information after completing sending the feedback information until the sidelink control information and/or the sidelink data information are/is obtained through listening, the terminal on the receiver side is always in the active period. Consequently, the terminal on the receiver side consumes a large amount of power, and the terminal is unable to save current energy.

It can be learned that, based on the foregoing feedback mechanism, energy saving for both the terminal on the transmitter side and the terminal on the receiver side needs to be considered. Implementation of this application will resolve at least the foregoing problems.

For ease of reading the solutions of this application, the following first clarifies some concepts that will appear subsequently in embodiments of this application.

In this embodiment of this application, the reserved sidelink resource may also be referred to as a sidelink resource or an allocated sidelink resource. N resources included in a first resource set are reserved transmission resources used for a same transport block or different transport blocks. A periodic first resource set included in a second resource set is reserved transmission resources used for different transport blocks.

In this embodiment of this application, it may be understood that the SCI is located in first m symbols of a reserved sidelink resource. Optionally, when the SCI is two-level SCI, it may be understood that first-level SCI is located in first m symbols of a reserved sidelink resource; or the first-level SCI and second-level SCI are located in first m symbols of a reserved sidelink resource. m is a positive integer.

In this embodiment of this application, a terminal has both a sending function and a receiving function. When a terminal serves as a transmit end, the terminal is also referred to as a terminal on a transmitter side or a second terminal. When a terminal is used as a receive end, the terminal is also referred to as a terminal on a receiver side or a first terminal. For example, D2D communication is performed between a terminal 1 and a terminal 2. When the terminal 1 is a transmit end and the terminal 2 is a receive end, the terminal 1 is also referred to as a terminal on a transmitter side or a second terminal, and the terminal 2 is also referred to as a terminal on a receiver side or a first terminal. When the terminal 2 is a transmit end and the terminal 1 is a receive end, the terminal 2 is also referred to as a terminal on a transmitter side or a second terminal, and the terminal 1 is also referred to as a terminal on a receiver side or a first terminal.

In this embodiment of this application, when a timer is started at a moment, correspondingly, there is a corresponding alternative solution. That is, the timer is started after the moment. In other words, the timer is started at a moment immediately after the moment. For example, when a first timer is started at a first moment, correspondingly, the first timer may alternatively be started after the first moment. For another example, when the first timer is started at a second moment, correspondingly, the first timer may alternatively be started after the second moment.

In this embodiment of this application, when a timer is stopped at a moment, correspondingly, there is a corresponding alternative solution. That is, the timer is stopped before the moment. In other words, the timer is stopped at a moment immediately before the moment. For example, when a second timer is started at a third moment, correspondingly, the second timer may alternatively be started before the third moment. For another example, when the second timer is started at a fourth moment, correspondingly, the second timer may alternatively be started before the fourth moment.

To resolve a power consumption problem of the foregoing terminal (namely, the first terminal) on the receiver side, this application provides the following Embodiment 1. To resolve a power consumption problem of the foregoing terminal (namely, the second terminal) on the transmitter side, this application provides the following Embodiment 2.

It should be noted that the following Embodiment 1 and Embodiment 2 are decoupled. That is, implementation of the two embodiments does not depend on each other, and both are independent solutions. In exemplary embodiments, the two may be combined as an overall solution. That is, Embodiment 1 is used as an implementation solution of the terminal on the receiver side, and Embodiment 2 is used as an implementation solution of the terminal on the transmitter side. Alternatively, Embodiment 1 is used as an implementation solution of the terminal on the receiver side, and an implementation solution of the terminal on the transmitter side is different from that in Embodiment 2. Alternatively, Embodiment 2 is used as an implementation solution of the terminal on the transmitter side, and an implementation solution of the terminal on the receiver side may be different from that in Embodiment 1.

It should be noted that a first timer and a second timer in the terminal on the receiver side in the following Embodiment 1 are merely the same in names as a first timer and a second timer in the terminal on the transmitter side in the following Embodiment 2. They are essentially different timers. That is, the first timer in the terminal on the receiver side in Embodiment 1 is different from the first timer in the terminal on the transmitter side in Embodiment 2, and the second timer in the terminal on the receiver side in Embodiment 1 is different from the second timer in the terminal on the transmitter side in Embodiment 2.

Similarly, a first moment, a second moment, a third moment, and a fourth moment in the terminal on the receiver side in the following Embodiment 1 are also merely the same in names as a first moment, a second moment, a third moment, and a fourth moment in the terminal on the transmitter side in the following Embodiment 2. They are essentially different moments.

In this application, start may also be referred to as restart. When the feedback information is the HARQ information, starting any one of the following timers may be starting a timer corresponding to a HARQ process, or starting a timer for a HARQ process. Similarly, stopping any one of the following timers may be stopping a timer corresponding to a HARQ process, or stopping a timer for a HARQ process. Optionally, a timer corresponding to a process number included in the SCI may be started. The process may also be referred to as a process number The HARQ process may also be referred to as a HARQ process number.

In this application, stopping any timer at a moment may also be understood as stopping the timer when the timer exceeds corresponding duration. In this application, that the sidelink control information and/or the sidelink data information are/is not listened to may be understood as that the sidelink control information and/or the sidelink data information are/is not required/unnecessary to be listened to.

Embodiment 1

This embodiment is used for reducing power consumption of a terminal (that is, a first terminal) on a receiver side. In this embodiment, a first terminal starts a first timer after sending feedback information to a second terminal. The first timer indicates not to listen to sidelink control information and/or sidelink data information in at least one time unit after the first timer is started. In other words, within start duration of the first timer, the second terminal does not send the sidelink control information and/or the sidelink data information to the first terminal. Therefore, the first terminal does not need to listen to the sidelink control information and/or the sidelink data information within the duration. This can save energy. It may also be understood that the first timer indicates duration that the first terminal needs to wait before receiving expected sidelink retransmission data. The duration herein may be calculated in a unit of a slot, a symbol, or a subframe. For example, the feedback information is HARQ information. In this case, within the start duration of the first timer, the second terminal does not send sidelink control information and/or the sidelink data information of a first HARQ process to the first terminal. Therefore, the first terminal does not need to listen to, within the duration, the sidelink control information and/or the sidelink data information corresponding to the first HARQ process. This can save energy. The feedback information is also feedback information for the sidelink control information and/or the sidelink data information of the first HARQ process. In exemplary embodiments, HARQ process included in the sidelink control information is the first HARQ process.

Subsequently, after the first timer is stopped, the first terminal starts a second timer. For example, the second timer may be started at a stop moment of the first timer, or the second timer may be started at a moment after the stop moment of the first timer. When the feedback information sent by the first terminal is a measurement report of a sidelink or CSI of the sidelink, the second timer indicates a time period (including initially transmitted data and/or retransmitted data) for listening to the sidelink control information and/or the sidelink data information. When the feedback information sent by the first terminal is the HARQ information, the second timer indicates a time period for listening to retransmitted data on the sidelink. In other words, within duration after the second timer is started, the first terminal starts to listen to the sidelink control information and/or the sidelink data information (including initially transmitted data and/or retransmitted data, or including only retransmitted data). Optionally, that the second timer indicates the time period for listening to the retransmitted data on the sidelink may be understood as that the second timer indicates a time period for listening to retransmitted data corresponding to the first HARQ process on the sidelink. After the second timer is started, the first terminal expects to obtain, through listening, the sidelink control information and/or the sidelink data information corresponding to the first HARQ process.

Figure 5:
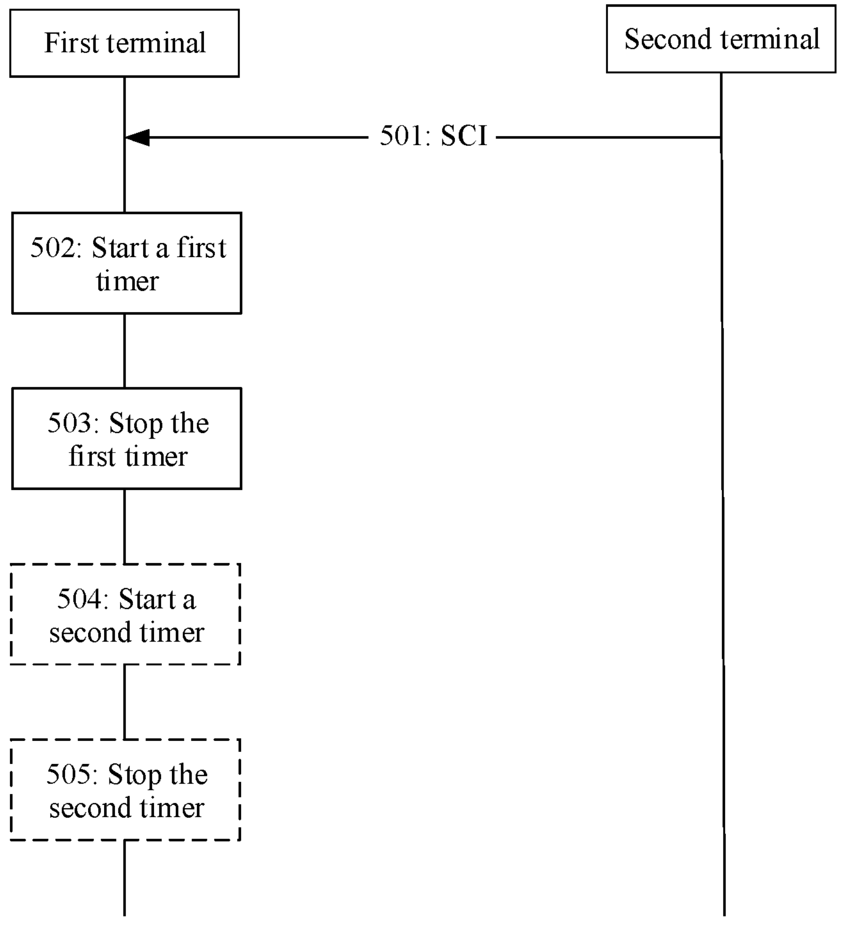
FIG. 5 is a schematic diagram of a communication method, according to an embodiment of the present disclosure.

FIG. 5 is a communication method according to an embodiment of this application. The method includes the following steps.

Step 501: A second terminal sends SCI to a first terminal. Correspondingly, the first terminal receives the SCI.

Optionally, when correct detection is performed, the first terminal may receive the SCI.

The SCI indicates a time domain resource of a sidelink. The time domain resource of the sidelink is used by the second terminal to send sidelink control information and/or sidelink data information to the first terminal. Alternatively, it is understood that the second terminal sends the sidelink control information and/or the sidelink data information to the first terminal on the time domain resource that is of the sidelink and that is indicated by the SCI.

It should be noted that the SCI may indicate not only the time domain resource of the sidelink, but also a frequency domain resource of the sidelink. The time domain resource and/or the frequency domain resource indicated by the SCI may be reserved or scheduled, or some resources are reserved and some resources are scheduled.

After step 501, the second terminal configures time domain resources of one or more sidelinks for the first terminal, and may send the sidelink control information and/or the sidelink data information to the first terminal on these time domain resources.

After step 501, the first terminal may send feedback information to the second terminal. The feedback information may be a measurement report of the sidelink, CSI of the sidelink, HARQ information of the sidelink, or the like. The CSI of the sidelink includes one or more of a channel quality indication (Channel Quality Indication, CQI), a precoding matrix indication (Precoding Matrix Indication, PMI), a rank indication (Rank Indication, RI), and the like. For example, the CSI of the sidelink is only a CQI.

Step 502: The first terminal starts a first timer.

Optionally, the first terminal starts the first timer at a moment after sending the feedback information. The first timer indicates not to listen to the sidelink control information and/or the sidelink data information in at least one time unit after the first timer is started. This can save energy.

In an implementation, the first terminal may start the first timer at a first moment or after the first moment. The first moment is associated with a time domain resource that is of a sidelink and that is occupied or indicated by the SCI in step 501. "Associated with" means related to the time domain resource that is of the sidelink and that is occupied or indicated by the SCI. The time domain resource that is of the sidelink and that is occupied by the SCI is one or more symbols occupied by the SCI.

In exemplary embodiments, the first moment may be any one of the following:

(1) a start symbol of the SCI;

(2) a next symbol of the start symbol of the SCI;

(3) an end symbol of the SCI;

(4) a next symbol of the end symbol of the SCI;

(5) a start symbol of a first time domain resource indicated by the SCI;

(6) a next symbol of the start symbol of the first time domain resource indicated by the SCI;

(7) an end symbol of the first time domain resource indicated by the SCI;

(8) a next symbol of the end symbol of the first time domain resource indicated by the SCI;

(9) the start symbol/end symbol of the first time domain resource indicated by the SCI plus a first offset; and

(10) the start symbol/end symbol of the SCI plus the first offset.

Optionally, the first offset is configured by using RRC signaling, and the RRC signaling is PC5 RRC signaling or RRC signaling from a network device. Optionally, the first offset may also be predefined. For example, the first offset may be processing latency for the feedback information.

In another implementation, the first terminal may start the first timer at a second moment or after the second moment. The second moment is associated with a time domain resource occupied by the feedback information sent by the first terminal. "Associated with" means related to the time domain resource occupied by the feedback information sent by the first terminal.

The second moment may be any one of the following:

(1) an end moment of the feedback information;

(2) a next symbol of a symbol occupied by the feedback information;

(3) the symbol occupied by the feedback information plus a second offset;

(4) a next slot of the time domain resource occupied by the feedback information, where the time domain resource occupied by the feedback information may be understood as a slot occupied by the feedback information or a slot in which the symbol occupied by the feedback information is located; and (5) a next slot of the slot occupied by the feedback information.

Optionally, the second offset is configured by using RRC signaling, and the RRC signaling is PC5 RRC signaling or RRC signaling from a network device. Optionally, the second offset may also be predefined.

Step 503: The first terminal stops the first timer.

This step is optional.

In an implementation, the first terminal may stop the first timer at a third moment or before the third moment. The third moment is obtained based on first duration, and the first duration is associated with latency that is of a time domain resource used for sidelink transmission and that is obtained by the second terminal. Herein, stopping the first timer before the third moment is to ensure that receiving of subsequent control information/data information is not missed or not missed as much as possible. In other words, the subsequent control information/data information is received in time/early.

The "obtaining" herein may be detection, selection, reselection, detection and selection, or detection and reselection.

Optionally, the first terminal may stop the first timer after the third moment. Herein, stopping the first timer after the third moment means that the first timer is a minimum limitation. After the first timer, it can be ensured that receiving of the subsequent control information/data information is not missed. In other words, after the first timer, the subsequent control information/data information can be received in time/early.

In another implementation, when the first duration is met or when the first duration is exceeded, the first terminal stops the first timer.

The first duration is associated with the latency that is of the time domain resource used for sidelink transmission and that is obtained by the second terminal, or is associated with the time domain resource that is of the sidelink and that is indicated by the SCI, or the first duration is configured for the first terminal by using signaling. The first duration being exceeded may be understood as that the time exceeds the first duration since or after the first timer is started.

The time domain resource used for sidelink transmission includes at least one of a time domain resource used for initial transmission of the sidelink transmission and/or a time domain resource used for retransmission of the sidelink transmission.

Optionally, the first duration is any one of the following: T1, T2, T1+T3, T4, T1+T4, T2+T4, T1+T3+T4, T5, T5+T4, T5+T1, or T5+T1+T4.

Optionally, the first duration is a combination value of at least one or more of the following several capability parameters or measurement parameters: T1, T2, T3, T4, or T5. The combination value is a sum of any several values of T1, T2, T3, T4, or T5. T1 is duration used by the second terminal to complete a resource detection and selection process. T2 is duration used by the second terminal to identify a candidate resource and select a resource used for sidelink transmission. T3 is latency in processing the feedback information by the second terminal. T4 is a delay of a resource selection window of the second terminal relative to a resource detection window of the second terminal or latency/a lag time/duration of a start moment of the resource selection window relative to an end moment of the resource detection window. T5 is duration in which the second terminal completes SCI decoding/parsing or duration in which the second terminal completes SCI decoding/parsing and performs RSRP/RSSI measurement. Optionally, the duration used by the second terminal to identify the candidate resource and select the resource used for sidelink transmission may be duration used by the second terminal to identify the candidate resource and select a resource set used for potential sidelink transmission. Optionally, the RSRP measurement is RSRP measurement of a DMRS in the resource detection process. Optionally, the RSSI measurement is measurement of sidelink energy in the resource detection process.

Figure 6:
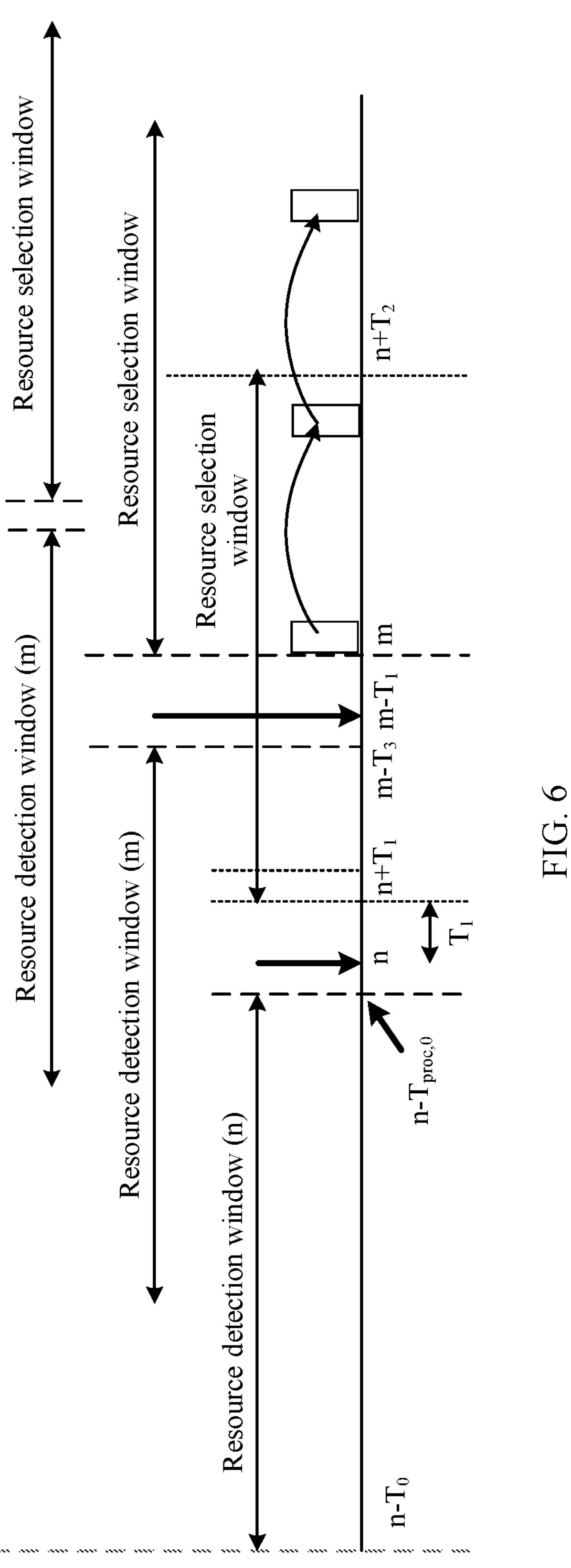
FIG. 6 is a schematic diagram of resource detection and selection, according to an embodiment of the present disclosure.

FIG. 6 is a schematic diagram of resource detection and selection. In an example, the T1 may be T3 in FIG. 6, the T2 may be $T_{proc,\ 1}$ in FIG. 6, the T4 may be T1 in FIG. 6, and the T5 may be $T_{proc,\ 0}$ in FIG. 6.

In this application, any duration value such as first duration or second duration may be configured for a terminal by using signaling. The signaling configuration mentioned in this application includes any one or a combination of RRC signaling, MAC signaling, or physical layer signaling. Optionally, RRC signaling from a network device or PC5 RRC signaling may be used. Optionally, a list (a list or an entry list) may be configured by using RRC signaling from the network device, and an entry index is indicated by using SCI. Optionally, an entry list may be configured by using the PC5 RRC signaling, and an index (an index or an entry index) is indicated by using the SCI.

In this application, considering that different terminals have respective corresponding capability parameters or measurement parameters, the first duration is correspondingly set based on a maximum capability value or a minimum capability value of the terminal, to ensure that the first duration is applicable to different terminals. Optionally, the first duration is correspondingly set based on a default maximum capability value or a default minimum capability value, to ensure that the first duration is applicable to different terminals. That is, it is ensured that any duration value is not too underestimated, and any duration value is not too overestimated. The setting may be set by the network device, or set by a transmit terminal and notified to a receive terminal.

In another implementation, the first terminal may further stop the first timer at a fourth moment or before the fourth moment. The fourth moment is associated with the time domain resource that is of the sidelink and that is indicated by the SCI in step 501. "Associated with" means related to the time domain resource that is of the sidelink and that is occupied or indicated by the SCI. The time domain resource that is of the sidelink and that is occupied by the SCI is one or more symbols occupied by the SCI. Herein, stopping the first timer before the fourth moment is to ensure that receiving of the subsequent control information/data information is not missed or not missed as much as possible. In other words, the subsequent control information/data information is received in time/early.

Optionally, the time domain resource that is of the sidelink, that is indicated by the SCI, and that is associated with the fourth moment is different from the time domain resource that is of the sidelink, that is indicated by SCI, and that is associated with the first moment.

Optionally, the first terminal may stop the first timer after the fourth moment. Herein, stopping the first timer after the fourth moment means that it is understood that the first timer is a minimum limitation. After the first timer, it can be ensured that receiving of the subsequent control information/data information is not missed. In other words, after the first timer, the subsequent control information/data information can be received in time/early.

The following provides implementations of the fourth moment in two different scenarios.

Scenario 1: The time domain resource that is of the sidelink and that is indicated by the SCI in step 501 includes a first resource set. The first resource set includes time domain resources of N sidelinks. N is a positive integer.

In this scenario, the fourth moment may be any one of the following:

(1) a fifth moment;

(2) the fifth moment plus a third offset; and (3) a sum of the first moment and duration corresponding to a first difference, where the first difference is a difference between the first moment (that is, a start moment of the first timer) and the fifth moment.

The duration corresponding to the first difference is duration occupied by a slot corresponding to the first difference or duration occupied by rounding up or rounding down to a nearest integer from the slot corresponding to the first difference. For example, if the first difference corresponds to three slots, the first difference is duration occupied by the three slots. For another example, if the first difference corresponds to 3.5 slots, the first difference is duration occupied by four slots or duration occupied by three slots.

Optionally, the sum of the first moment and the duration corresponding to the first difference may alternatively be a value obtained by rounding up or rounding down to a nearest integer from the sum of the first moment and the duration corresponding to the first difference.

(4) a sum of the second moment and duration corresponding to a second difference, where the second difference is a difference between the second moment (that is, the start moment of the first timer) and the fifth moment.

The duration corresponding to the second difference is duration occupied by a slot corresponding to the second difference or duration occupied by rounding up or rounding down to a nearest integer from the slot corresponding to the second difference. For example, if the second difference corresponds to four slots, the second difference is duration occupied by the four slots. For another example, if the second difference corresponds to 4.3 slots, the second difference is duration occupied by five slots or duration occupied by four slots.

Optionally, the sum of the second moment and the duration corresponding to the second difference may alternatively be a value obtained by rounding up or rounding down to a nearest integer from the sum of the second moment and the duration corresponding to the second difference.

In this application, rounding up to the nearest integer is used to save more energy because it is considered that a duration limit is strict. Rounding down to the nearest integer is used to achieve that receiving of the subsequent control information/data information is not missed/in time/early because a conservative duration limit is considered.

In all examples of this application, the duration being a slot is used as an example, and the duration may not be limited to a slot. For example, the duration may be a subframe, a symbol, or a mini-slot.

Optionally, the first difference and/or the second difference are/is an absolute value, that is, an absolute value obtained by subtracting of the first difference and/or the second difference.

Optionally, the third offset is a positive value.

Optionally, the third offset may alternatively be a negative value. In this case, the fifth moment plus the third offset may also be understood as the fifth moment minus a positive third offset.

The fifth moment in (1) to (4) may be any one of the following:

(1) a start symbol of an $x^{th}$ time domain resource that is in the first resource set and that is indicated by the SCI, where x is an integer less than or equal to N and greater than 1;

(2) a next symbol of the start symbol of the $x^{th}$ time domain resource that is in the first resource set and that is indicated by the SCI, where x is an integer less than or equal to N and greater than 1;

(3) an end symbol of the $x^{th}$ time domain resource that is in the first resource set and that is indicated by the SCI, where x is an integer less than or equal to N and greater than 1; and (4) a next symbol of the end symbol of the $x^{th}$ time domain resource that is in the first resource set and that is indicated by the SCI, where x is an integer less than or equal to N and greater than 1.

Scenario 2: The time domain resource that is of the sidelink and that is indicated by the SCI in step 501 includes a second resource set. The second resource set includes a periodic first resource set. The first resource set includes time domain resources of N sidelinks. N is a positive integer.

In this scenario, the fourth moment may be any one of the following:

(1) a sixth moment;

(2) the sixth moment plus a fourth offset; and (3) a sum of the first moment and duration corresponding to a third difference.

The third difference is a difference between the first moment (that is, the start moment of the first timer) and the sixth moment.

The duration corresponding to the third difference is duration occupied by a slot corresponding to the third difference or duration occupied by rounding up or rounding down to a nearest integer from the slot corresponding to the third difference. For example, if the third difference corresponds to three slots, the third difference is duration occupied by the three slots. For another example, if the third difference corresponds to 3.5 slots, the third difference is duration occupied by four slots or duration occupied by three slots.

Optionally, the sum of the first moment and the duration corresponding to the third difference may alternatively be a value obtained by rounding up or rounding down to a nearest integer from the sum of the first moment and the duration corresponding to the third difference.

(4) a sum of the second moment and duration corresponding to a fourth difference, where the fourth difference is a difference between the second moment (that is, the start moment of the first timer) and the sixth moment.

The duration corresponding to the fourth difference is duration occupied by a slot corresponding to the fourth difference or duration occupied by rounding up or rounding down to a nearest integer from the slot corresponding to the fourth difference. For example, if the fourth difference corresponds to four slots, the fourth difference is duration occupied by the four slots. For another example, if the fourth difference corresponds to 4.3 slots, the fourth difference is duration occupied by five slots or duration occupied by four slots.

Optionally, the sum of the second moment and the duration corresponding to the fourth difference may alternatively be a value obtained by rounding up or rounding down to a nearest integer from the sum of the second moment and the duration corresponding to the fourth difference.

In this application, rounding up to the nearest integer is used to save more energy because it is considered that a duration limit is strict. Rounding down to the nearest integer is used to achieve that receiving of the subsequent control information/data information is not missed/in time/early because a conservative duration limit is considered.

Optionally, the third difference and/or the fourth difference is an absolute value, that is, an absolute value obtained by subtracting of the third difference and the fourth difference.

Optionally, the fourth offset is a positive value.

Optionally, the fourth offset may alternatively be a negative value. In this case, the sixth moment plus the fourth offset may also be understood as the sixth moment minus a positive fourth offset.

The sixth moment in (1) to (4) is any one of the following:

(1) a start symbol of a $z^{th}$ time domain resource that is in a $y^{th}$ first resource set in the second resource set and that is indicated by the SCI, where y is a positive integer, and z is a positive integer less than or equal to N;

(2) a next symbol of the start symbol of the $z^{th}$ time domain resource that is in the $y^{th}$ first resource set in the second resource set and that is indicated by the SCI, where y is a positive integer, and z is a positive integer less than or equal to N;

(3) an end symbol of the $z^{th}$ time domain resource that is in the $y^{th}$ first resource set in the second resource set and that is indicated by the SCI, where y is a positive integer, and z is a positive integer less than or equal to N; and (4) a next symbol of the end symbol of the $z^{th}$ time domain resource that is in the $y^{th}$ first resource set in the second resource set and that is indicated by the SCI, where y is a positive integer, and z is a positive integer less than or equal to N.

The foregoing provides different implementations for the first moment, the second moment, the third moment, and the fourth moment when the SCI in step 501 is first-level SCI.

The following provides different implementations for the first moment, the second moment, the third moment, and the fourth moment when the SCI in step 501 is second-level SCI (including the first-level SCI and the second-level SCI).

When the SCI in step 501 is the second-level SCI (including the first-level SCI and the second-level SCI), and the first terminal starts the first timer at the first moment, the first moment may be any one of the following:

(1) a start symbol of the first-level SCI or a start symbol of the second-level SCI;

(2) a next symbol of the start symbol of the first-level SCI or a next symbol of the start symbol of the second-level SCI;

(3) an end symbol of the first-level SCI or an end symbol of the second-level SCI;

(4) a next symbol of the end symbol of the first-level SCI or a next symbol of the end symbol of the second-level SCI;

(5) a start symbol of a first time domain resource indicated by the first-level SCI;

(6) a next symbol of the start symbol of the first time domain resource indicated by the first-level SCI;

(7) an end symbol of the first time domain resource indicated by the first-level SCI;

(8) a next symbol of the end symbol of the first time domain resource indicated by the first-level SCI;

(9) the start symbol/end symbol of the first time domain resource indicated by the first-level SCI plus a first offset; and

(10) the start symbol/end symbol of the first-level SCI plus the first offset.

When the SCI in step 501 is the second-level SCI (including the first-level SCI and the second-level SCI), and the first-level SCI indicates a first resource set, the first resource set includes time domain resources of N sidelinks, N is a positive integer, and the first terminal stops the first timer at the fourth moment. The fourth moment may be any one of the following:

(1) a start symbol of an $x^{th}$ time domain resource in the first resource set, where x is an integer less than or equal to N and greater than 1;

(2) a next symbol of the start symbol of the $x^{th}$ time domain resource in the first resource set, where x is an integer less than or equal to N and greater than 1;

(3) an end symbol of the $x^{th}$ time domain resource in the first resource set, where x is an integer less than or equal to N and greater than 1;

(4) a next symbol of the end symbol of the $x^{th}$ time domain resource in the first resource set, where x is an integer less than or equal to N and greater than 1.

When the SCI in step 501 is the second-level SCI (including the first-level SCI and the second-level SCI), and the first terminal starts the first timer at the second moment, the second moment may be any one of the following:

(1) an end moment of the feedback information;

(2) a next symbol of a symbol occupied by the feedback information;

(3) the symbol occupied by the feedback information plus a second offset.

Optionally, the second offset is configured by using RRC signaling, and the RRC signaling is PC5 RRC signaling or RRC signaling from a network device.

When the SCI in step 501 is the second-level SCI (including the first-level SCI and the second-level SCI), and the first terminal stops the first timer at the third moment, the third moment is obtained based on the first duration. The first duration is associated with the latency that is of the time domain resource used for sidelink transmission and that is obtained by the second terminal.

Optionally, the first duration is any one of the following:

T1, T2, T1+T3, T4, T1+T4, T2+T4, T1+T3+T4, T5, T5+T4, T5+T1, or T5+T1+T4.

Optionally, the first duration is a combination value of at least one or more of the following several capability parameters or measurement parameters: T1, T2, T3, T4, or T5. The combination value is a sum of any several values of T1, T2, T3, T4, or T5.

T1 is duration used by the second terminal to complete a resource detection and selection process. T2 is duration used by the second terminal to identify a candidate resource and select a resource used for sidelink transmission. T3 is latency in processing the feedback information by the second terminal. T4 is a delay of a resource selection window of the second terminal relative to a resource detection window of the second terminal or latency/a lag time/duration of a start moment of the resource selection window relative to an end moment of the resource detection window. T5 is duration in which the second terminal completes SCI decoding/parsing or duration in which the second terminal completes SCI decoding/parsing and performs RSRP/RSSI measurement. Optionally, the duration used by the second terminal to identify the candidate resource and select the resource used for sidelink transmission may be duration used by the second terminal to identify the candidate resource and select a resource set used for potential sidelink transmission. Optionally, the RSRP measurement is RSRP measurement of a DMRS in the resource detection process. Optionally, the RSSI measurement is measurement of sidelink energy in the resource detection process.

When the SCI in step 501 is the second-level SCI (including the first-level SCI and the second-level SCI), and the first-level SCI indicates a second resource set, the second resource set includes a periodic first resource set, the first resource set includes time domain resources of N sidelinks, N is a positive integer, and the first terminal stops the first timer at the fourth moment. The fourth moment may be any one of the following:

(1) a start symbol of a $z^{th}$ time domain resource in a $y^{th}$ first resource set in the second resource set, where y is a positive integer, and z is a positive integer less than or equal to N;

(2) a next symbol of the start symbol of the $z^{th}$ time domain resource in the $y^{th}$ first resource set in the second resource set, where y is a positive integer, and z is a positive integer less than or equal to N;

(3) an end symbol of the $z^{th}$ time domain resource in the $y^{th}$ first resource set in the second resource set, where y is a positive integer, and z is a positive integer less than or equal to N;

(4) a next symbol of the end symbol of the $z^{th}$ time domain resource in the $y^{th}$ first resource set in the second resource set, where y is a positive integer, and z is a positive integer less than or equal to N.

In conclusion, when the feedback information sent by the first terminal is the measurement report of the sidelink or the channel state information of the sidelink, the first terminal starts the first timer at the first moment or the second moment. In at least one time unit within a start time of the first timer, the first terminal does not need to listen to the sidelink control information or data information until the first terminal stops the first timer at the third moment or the fourth moment. In exemplary embodiments, the first terminal starts the first timer at the first moment, and does not need to listen to the sidelink control information or data information after completing sending of the feedback information and before the second terminal sends corresponding data based on the feedback information. When the first moment is a last resource included in the SCI, an end moment of the first timer is the third moment. Before obtaining a next resource, the first terminal does not need to listen to the sidelink control information or data information. When the first moment is not the last resource included in the SCI, the end moment of the first timer is the fourth moment. Before a moment related to a next resource indicated by the SCI, the first terminal does not need to listen to the sidelink control information or data information.

When the feedback information is the HARQ information of the sidelink, the first terminal starts the first timer at the first moment or the second moment. In at least one time unit within a start time of the first timer, the first terminal does not need to listen to the retransmitted data on the sidelink until the first terminal stops the first timer at the third moment or the fourth moment. In exemplary embodiments, the first terminal starts the first timer at the first moment, and does not need to listen to the retransmitted data on the sidelink after completing sending of the feedback information and before the second terminal sends corresponding data based on the feedback information. When the first moment is a last resource included in the SCI, an end moment of the first timer is the third moment. Before obtaining a next resource, the first terminal does not need to listen to the retransmitted data on the sidelink. When the first moment is not the last resource included in the SCI, the end moment of the first timer is the fourth moment. Before a moment related to a next resource indicated by the SCI, the first terminal does not need to listen to the retransmitted data on the sidelink.

It should be noted that the third moment is a moment after the first moment or the second moment, and the fourth moment is a moment after the first moment or the second moment.

Optionally, after step 502 or 503, the method may further include the following step 504 to step 505.

Step 504: The first terminal starts a second timer.

In exemplary embodiments, the first terminal starts the second timer at a seventh moment. The seventh moment is a stop moment of the first timer or a moment after the stop moment of the first timer. For example, the seventh moment is a first symbol after the stop moment of the first timer.

When the feedback information is the measurement report of the sidelink or the CSI of the sidelink, the second timer indicates a time period for listening to the sidelink control information and/or the sidelink data information.

When the feedback information is the HARQ information, the second timer indicates a time period for listening to retransmitted data on the sidelink. The retransmitted data herein may be control information or data information that is on the sidelink and that is used for transmitting the retransmitted data. Optionally, the retransmitted data herein may be control information or data information that is on the sidelink and that is used for transmitting a first HARQ process/retransmitted data corresponding to the first HARQ process.

Step 505: The first terminal stops the second timer.

In a possible implementation, the first terminal stops the second timer at an eighth moment. The eighth moment is obtained based on second duration. The second duration is configured by using RRC signaling, or is a duration value associated with duration of a resource selection window, or is a duration value associated with duration of resource selection/reselection.

In another implementation, when the second duration is met or when the second duration is exceeded, the first terminal stops the second timer.

The second duration is associated with duration of a resource selection window, or is associated with duration of resource selection/reselection, or the second duration is configured for the first terminal by using signaling. The signaling is RRC signaling from a network device, or PC5 RRC signaling. The second duration being exceeded may be understood as that the time exceeds the second duration since or after the second timer is started.

The duration value associated with the duration of the resource selection window may be duration of the resource selection window of the second terminal, or duration of a default/predefined resource selection window, or duration of a default/predefined resource selection window plus a parameter value, or duration of a default/predefined resource selection window timing a parameter value. The duration of the default/predefined resource selection window is irrelevant to any terminal, and may be a maximum value of a resource selection window of a terminal working on the sidelink, to avoid missing detection of any transmitted control information/data information, or missing detection of any retransmitted control information/data information.

By performing the foregoing step 504 to step 505, the first terminal may start to listen to the sidelink control information and/or the sidelink data information or listen to the retransmitted data on the sidelink only within a start time of the second timer. On the one hand, it can be ensured that the first terminal can listen to the sidelink control information and/or the sidelink data information or listen to the retransmitted data on the sidelink in the corresponding time period. On the other hand, because the time period for listening is set, severe power consumption caused by blind listening can be avoided, and therefore energy can be saved.

The following describes methods for using the first timer and the second timer with reference to six examples. In the following example, that the feedback information is HARQ information and the HARQ information is a NACK is used as an example.

Example 1

Figures 7, 8:
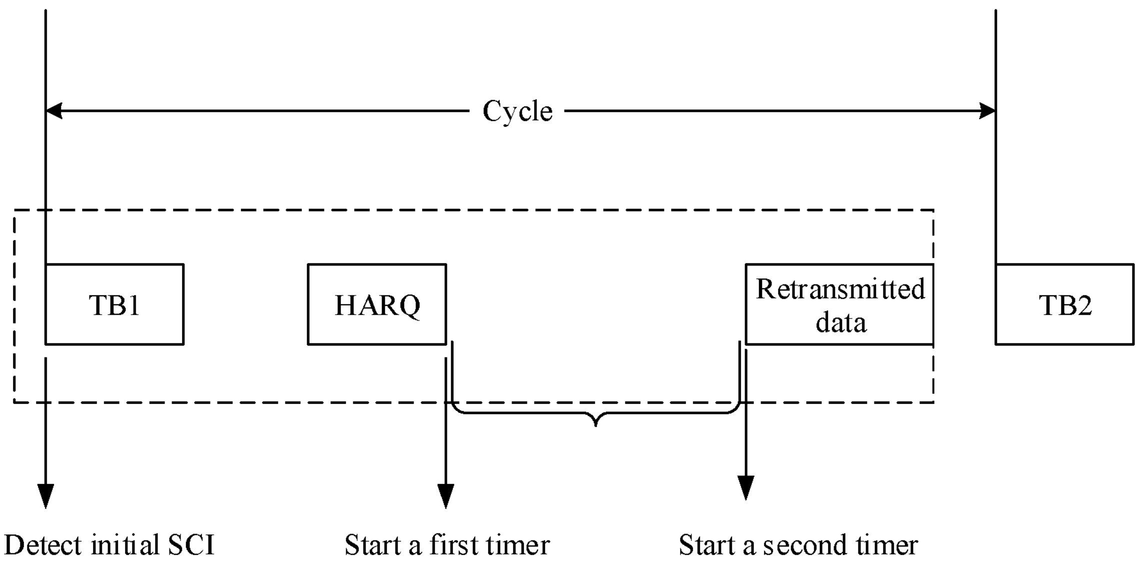
FIG. 7 is a usage example 1 of a timer, according to an embodiment of the present disclosure.
FIG. 8 is a usage example 2 of a timer, according to an embodiment of the present disclosure.

FIG. 7 is a usage example 1 of a timer. In this example, blind retransmission is disabled. For example, one sidelink resource (that is, a resource used for transmitting a TB1 in FIG. 7) is reserved in SCI.

The first timer is set to:

(1) a start moment, where the start moment is a first symbol after a first moment at which a HARQ feedback can be performed, or the first symbol after the first moment at which the HARQ feedback can be performed plus an offset MinTimeGapPSFCH; and (2) a stop moment, where the first timer is started, and is stopped after being lasted for first duration.

The first duration is T1, T2, T1+T3, T4, T1+T4, T2+T4, T1+T3+T4, T5, T5+T4, T5+T1, or T5+T1+T4 described above.

The second timer is set to:

(1) a start moment, where the start moment is the stop moment of the first timer or a moment after the stop moment of the first timer is used as the start moment of the second timer; and (2) a stop moment, where the second timer is started, and is stopped after being lasted for second duration.

The second duration is configured by a network device by using RRC signaling or is a duration value associated with duration of a resource selection window.

It should be noted that if a first terminal successfully receives and demodulates retransmitted data before the stop moment of the second timer, the first terminal may stop the second timer in advance.

Example 2

FIG. 8 is a usage example 2 of a timer. In this example, blind retransmission is enabled. For example, one sidelink resource (that is, a resource used for transmitting a TB1 in FIG. 8) is reserved in SCI.

The first timer is set to:

(1) a start moment, where the start moment is a first symbol after transmission of a time domain resource on a first reserved sidelink ends or the first symbol after transmission of the time domain resource on the first reserved sidelink ends plus an offset MinTimeGapPSFCH; and (2) a stop moment, where the first timer is started, and is stopped after being lasted for first duration.

The first duration is T1, T2, T1+T3, T4, T1+T4, T2+T4, T1+T3+T4, T5, T5+T4, T5+T1, or T5+T1+T4 described above.

The second timer is set to:

(1) a start moment, where the start moment is the stop moment of the first timer or a moment after the stop moment of the first timer is used as the start moment of the second timer; and (2) a stop moment, where the second timer is started, and is stopped after being lasted for second duration.

The second duration is configured by a network device by using RRC signaling or is a duration value associated with duration of a resource selection window.

It should be noted that if a first terminal successfully receives and demodulates retransmitted data before the stop moment of the second timer, the first terminal may stop the second timer in advance.

Example 3

Figures 9, 10:
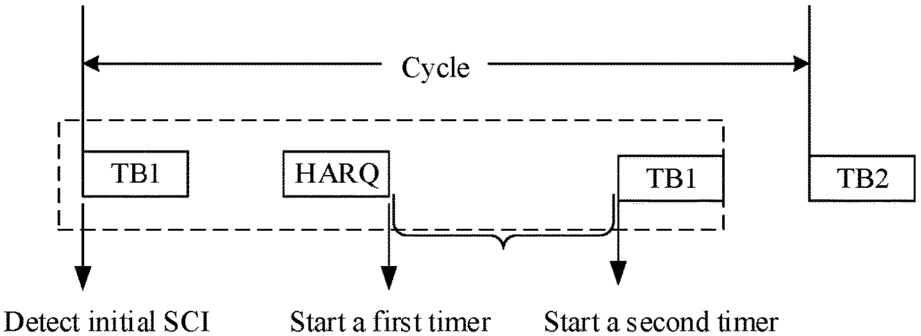
FIG. 9 is a usage example 3 of a timer, according to an embodiment of the present disclosure.
FIG. 10 is a usage example 4 of a timer, according to an embodiment of the present disclosure.

FIG. 9 is a usage example 3 of a timer. In this example, blind retransmission is disabled. For example, two sidelink resources (that is, two resources used for transmitting two TB1*s* in FIG. 9, in the following, a resource corresponding to a first TB1 is referred to as a resource 1, and a resource corresponding to a second TB1 is referred to as a resource 2) is reserved in SCI. A first moment at which a HARQ feedback can be performed is after the resource 1 and before the resource 2.

The first timer is set to:

(1) a start moment, where the start moment is a first symbol after a first moment at which a HARQ feedback can be performed, or the first symbol after the first moment at which the HARQ feedback can be performed plus an offset MinTimeGapPSFCH; and (2) a stop moment, where the stop moment is a start moment of the resource 2.

The second timer is set to:

(1) a start moment, where the start moment is the stop moment of the first timer or a moment after the stop moment of the first timer is used as the start moment of the second timer; and (2) a stop moment, where the second timer is started, and is stopped after being lasted for second duration.

The second duration is configured by a network device by using RRC signaling or is a duration value associated with duration of a resource selection window.

It should be noted that if a first terminal successfully receives and demodulates retransmitted data before the stop moment of the second timer, the first terminal may stop the second timer in advance.

Example 4

FIG. 10 is a usage example 4 of a timer. In this example, blind retransmission is disabled. For example, two sidelink resources (that is, two resources used for transmitting two TB1*s* in FIG. 9, in the following, a resource corresponding to a first TB1 is referred to as a resource 1, and a resource corresponding to a second TB1 is referred to as a resource 2) is reserved in SCI. A first moment at which a HARQ feedback can be performed is after the second TB1 and before the first TB2. In addition, data of the second TB1 is not successfully received, and needs to be retransmitted. The first timer is set to:

(1) a start moment, where the start moment is a first symbol after a first moment at which a HARQ feedback can be performed, or the first symbol after the first moment at which the HARQ feedback can be performed plus an offset MinTimeGapPSFCH; and (2) a stop moment, where the first timer is started, and is stopped after being lasted for first duration.

The first duration is T1, T2, T1+T3, T4, T1+T4, T2+T4, T1+T3+T4, T5, T5+T4, T5+T1, or T5+T1+T4 described above.

The second timer is set to:

(1) a start moment, where the stop moment of the first timer is used as the start moment of the second timer; and (2) a stop moment, where the second timer is started, and is stopped after being lasted for second duration.

The second duration is configured by a network device by using RRC signaling or is a duration value associated with duration of a resource selection window.

It should be noted that if a first terminal successfully receives and demodulates retransmitted data before the stop moment of the second timer, the first terminal may stop the second timer in advance.

Example 5

In an implementation, when a channel congestion rate is greater than a channel congestion rate threshold, a stop moment of the first timer and a start moment of the second timer may be set to a start moment of a next resource cycle. When a channel is congested, even if a first terminal sends NACK feedback information to a second terminal, considering that the second terminal may not detect a new resource used for retransmitting data because the channel is congested. Therefore, the second terminal cannot reallocate a resource to retransmit the data. In this case, a resource in a next resource cycle may be used for retransmitting the data.

In another implementation, reference may be made to a priority value included in SCI. When the priority value is less than a priority threshold, it indicates that a probability of obtaining a resource through preemption is low. In this case, the stop moment of the first timer and the start moment of the second timer may be set to the start moment of the next resource cycle.

The channel congestion rate threshold and/or the priority threshold may be configured by using RRC signaling. For example, the configuration is performed by using RRC signaling from a network device or PC5 RRC signaling.

In another implementation, the foregoing two solutions may also be combined for use.

Therefore, in Example 5, the first terminal receives SCI from the second terminal, where the SCI indicates a time domain resource of a sidelink.

The first terminal starts the first timer at a first moment. The first moment is associated with a time domain resource that is of a sidelink and that is occupied or indicated by the SCI. A second moment is associated with a time domain resource occupied by feedback information sent by the first terminal. The feedback information includes a measurement report of the sidelink, CSI of the sidelink, or HARQ information of the sidelink. The first timer indicates not to listen to the sidelink control information and/or sidelink data information in at least one time unit after the first timer is started.

When the channel congestion rate is greater than the channel congestion rate threshold and/or the priority value in the SCI is less than the priority threshold, the first terminal stops the first timer at a third moment or a fourth moment. The third moment is the start moment of the next resource cycle. The fourth moment is associated with the time domain resource that is of the sidelink and that is indicated by the SCI.

Meanings of the first moment, the second moment, and the fourth moment herein are the same as meanings of the first moment, the second moment, and the fourth moment in the foregoing embodiment. Refer to the foregoing descriptions. A meaning of the third moment herein is different from a meaning of the third moment in the foregoing embodiment. The third moment herein indicates the start moment of the next resource cycle.

In a possible implementation, the first terminal starts the second timer at a fifth moment. The fifth moment is a stop moment of the first timer or a first symbol after the stop moment of the first timer.

In a possible implementation, the first terminal stops the second timer at a sixth moment. The sixth moment is obtained based on second duration. The second duration is configured by using RRC signaling, or is a duration value associated with duration of a resource selection window, or is a duration value associated with duration of resource selection/reselection.

Embodiment 2

This embodiment is used for reducing power consumption of a terminal (that is, a second terminal) on a transmitter side. In this embodiment, the second terminal starts a first timer after sending SCI to a first terminal. The first timer indicates not to listen to, in the at least one time unit after the first timer is started, feedback information sent by the first terminal. That the feedback information sent by the first terminal is not listened to may be understood as that the feedback information sent by the first terminal is not required/unnecessary to be listened to. In other words, within start duration of the first timer, the first terminal does not send the feedback information to the second terminal. Therefore, the second terminal does not need to listen to the feedback information within the duration. This can save energy. For example, the feedback information is HARQ information. In this case, within the start duration of the first timer, the first terminal does not send the feedback information of a first HARQ process to the second terminal. Therefore, the second terminal does not need to listen to the feedback information within the duration. This can save energy.

Subsequently, after the first timer is stopped, the second terminal starts a second timer. For example, the second timer may be started at a stop moment of the first timer, or the second timer may be started at a moment after the stop moment of the first timer. The second timer indicates a time period for listening to the feedback information. In other words, the second terminal starts to listen to the feedback information only within duration after the second timer is started.

Figure 11:
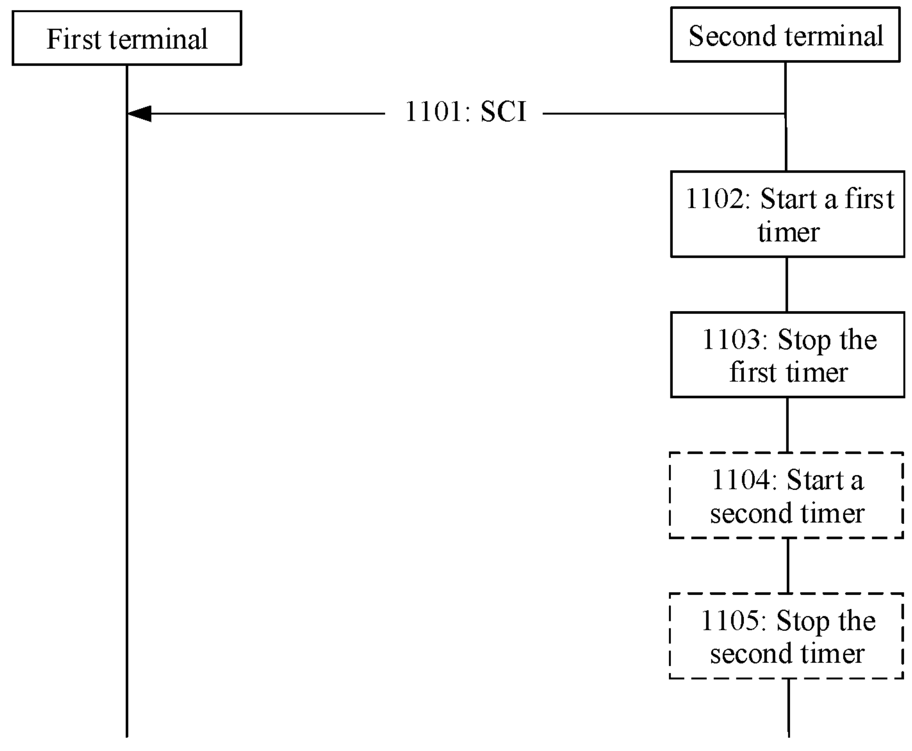
FIG. 11 is a schematic diagram of still another communication method, according to an embodiment of the present disclosure.

FIG. 11 is another communication method according to an embodiment of this application. The method includes the following steps.

Step 1101: A second terminal sends SCI to a first terminal.

Correspondingly, the first terminal receives the SCI.

Optionally, when correct detection is performed, the first terminal may receive the SCI.

Step 1101 is the same as step 501 in the embodiment in FIG. 5. Refer to the foregoing descriptions.

Step 1102: The second terminal starts a first timer.

The second terminal starts the first timer at a moment after sending the SCI. The first timer indicates not to listen to the feedback information in at least one time unit after the first timer is started. This can save energy.

The first terminal may start the first timer at a first moment. The first moment is associated with a time domain resource that is of a sidelink and that is occupied or indicated by the SCI in step 1101. "Associated with" means related to the time domain resource that is of the sidelink and that is occupied or indicated by the SCI. The time domain resource that is of the sidelink and that is occupied by the SCI is one or more symbols occupied by the SCI.

In exemplary embodiments, the first moment may be any one of the following:

(1) a start symbol of the SCI;
(2) a next symbol of the start symbol of the SCI;
(3) an end symbol of the SCI;
(4) a next symbol of the end symbol of the SCI;
(5) a start symbol of a first time domain resource indicated by the SCI;
(6) a next symbol of the start symbol of the first time domain resource indicated by the SCI;
(7) an end symbol of the first time domain resource indicated by the SCI;
(8) a next symbol of the end symbol of the first time domain resource indicated by the SCI;
(9) the start symbol/end symbol of the first time domain resource indicated by the SCI plus a first offset; and
(10) the start symbol/end symbol of the SCI plus the first offset.

Optionally, the first offset is configured by using RRC signaling, and the RRC signaling is PC5 RRC signaling or RRC signaling from a network device. Optionally, the first offset may also be predefined. For example, the first offset may be processing latency for the feedback information.

Step 1103: The second terminal stops the first timer.

This step is optional.

In an implementation, the second terminal may stop the first timer at a second moment or before the second moment. The second moment is a moment before the first terminal sends the feedback information. The second moment is associated with a time domain resource occupied by the feedback information sent by the first terminal. Herein, stopping the first timer before the second moment is to ensure that receiving of subsequent feedback information is not missed. In other words, the subsequent feedback information is received in time/early.

Optionally, the second terminal may stop the first timer after the second moment. Herein, stopping the first timer after the second moment means that it is understood that the first timer is a minimum limitation. After the first timer, it can be ensured that receiving of the subsequent feedback information is not missed. In other words, after the first timer, the subsequent feedback information can be received in time/early.

The feedback information herein includes a measurement report of the sidelink, CSI of the sidelink, HARQ information of the sidelink.

Optionally, the second moment is any one of the following:

(1) a start moment of the feedback information;
(2) a previous symbol of a symbol occupied by the feedback information;
(3) the symbol occupied by the feedback information minus a second offset;
(4) a previous slot of the time domain resource occupied by the feedback information, where the time domain resource occupied by the feedback information may be understood as a slot occupied by the feedback information or a slot in which the symbol occupied by the feedback information is located; and (5) a previous slot of a slot occupied by the feedback information.

Optionally, the second offset is configured by using RRC signaling, and the RRC signaling is PC5 RRC signaling or RRC signaling from a network device. Optionally, the second offset may also be predefined.

In another implementation, when first duration is met or when the first duration is exceeded, the second terminal stops the first timer.

The first duration is associated with a time domain position in which the feedback information is sent, or the first duration is configured for the second terminal by using signaling. The signaling is RRC signaling from a network device, or PC5 RRC signaling. The first duration being exceeded may be understood as that the time exceeds the first duration since or after the first timer is started.

Optionally, after step 1102 or 1103, the method may further include the following step 1104 to step 1105.

Step 1104: The second terminal starts a second timer.

In exemplary embodiments, the second terminal starts the second timer at or after the third moment. The third moment is a stop moment of the first timer or a first symbol after the stop moment of the first timer. The second timer indicates a time period for listening to the feedback information.

Step 1105: The second terminal stops the second timer.

In a possible implementation, the second terminal stops the second timer at a fourth moment. The fourth moment is a value preconfigured or predefined by the network device or the second terminal.

The predefined value includes a predefined slot, or a quantity of slots or symbols occupied by one piece of feedback information. For example, one piece of HARQ information occupies two symbols or three symbols.

By performing the foregoing step 1104 to step 1105, the second terminal may start to listen to the feedback information only within a start time of the second timer. On the one hand, it can be ensured that the second terminal can obtain the feedback information through listening in the corresponding time period. On the other hand, because the time period for listening is set, severe power consumption caused by blind listening can be avoided, and therefore energy can be saved.

In another implementation, when second duration is met or when the second duration is exceeded, the second terminal stops the second timer.

The second duration is associated with duration occupied by the feedback information, or the second duration is configured for the second terminal by using signaling. The signaling is RRC signaling from a network device, or PC5 RRC signaling. The second duration being exceeded may be understood as that the time exceeds the second duration since or after the second timer is started.

It should be noted that, for the first terminal or the second terminal in any one of the foregoing embodiments, when a plurality of timers (including the first timer, the second timer, and another timer in the conventional technology other than the first timer and the second timer) is run, a union set of the plurality of timers needs to be taken to determine whether the first terminal or the second terminal is in an active period. That is, even if one of the timers indicates that no listening is required, and another timer indicates that the first terminal or the second terminal needs to be in the active period or needs to be listened to, the first terminal or the second terminal still needs to be in the active period or needs to be listened to.

In this application, the start symbol and the next symbol are described as follows.

A start symbol of the SCI In this application, the start symbol of the SCI may be a start point of the start symbol of the SCI, or an end point of the start symbol of the SCI. The start symbol of the SCI may also be referred to as start of the SCI, or start of receiving the SCI by the first terminal, or a start moment at which the first terminal receives the SCI.

A next symbol of the start symbol of the SCI In this application, the next symbol of the start symbol of the SCI may be a start point of the next symbol of the start symbol of the SCI, or an end point of the next symbol of the start symbol of the SCI. The end point of the start symbol of the SCI and the start point of the next symbol of the start symbol of the SCI may be a same moment. The next symbol of the start symbol of the SCI may also be referred to as a symbol after the first terminal receives the start symbol of the SCI, or an end moment at which the first terminal receives the start symbol of the SCI.

An end symbol of the SCI In this application, the end symbol of the SCI may be a start point of the end symbol of the SCI, or an end point of the end symbol of the SCI. The end symbol of the SCI may also be referred to as end of the SCI, or end of receiving the SCI by the first terminal, or an end time or an end moment at which the first terminal receives the SCI.

A next symbol of the end symbol of the SCI In this application, the next symbol of the end symbol of the SCI may be a start point of the next symbol of the end symbol of the SCI, or an end point of the next symbol of the end symbol of the SCI. The end point of the end symbol of the SCI and the start point of the next symbol of the end symbol of the SCI may be a same moment. The next symbol of the end symbol of the SCI may also be referred to as a symbol after the first terminal receives the end symbol of the SCI, or an end moment at which the first terminal receives the end symbol of the SCI.

A start symbol of a first time domain resource indicated by the SCI In this application, the start symbol of the first time domain resource indicated by the SCI may be a start point of the start symbol of the first time domain resource indicated by the SCI, or an end point of the start symbol of the first time domain resource indicated by the SCI.

The start symbol of the first time domain resource indicated by the SCI may be the same as the start symbol of the SCI. Alternatively, considering a quantity of symbols used by automatic gain control (AGC), the start symbol of the first time domain resource indicated by the SCI may be earlier than the start symbol of the SCI. Optionally, the start symbol of the SCI may be the start symbol of the first time domain resource indicated by the SCI plus a quantity of symbols for AGC.

A next symbol of the start symbol of the first time domain resource indicated by the SCI In this application, the next symbol of the start symbol of the first time domain resource indicated by the SCI may be a start point of the next symbol of the start symbol of the first time domain resource indicated by the SCI, or an end point of the next symbol of the start symbol of the first time domain resource indicated by the SCI. The end point of the start symbol of the first time domain resource and the start point of the next symbol of the start symbol of the first time domain resource may be a same moment.

An end symbol of the first time domain resource indicated by the SCI In this application, the end symbol of the first time domain resource indicated by the SCI may be a start point of the end symbol of the first time domain resource indicated by the SCI, or an end point of the end symbol of the first time domain resource indicated by the SCI.

A next symbol of the end symbol of the first time domain resource indicated by the SCI In this application, the next symbol of the end symbol of the first time domain resource indicated by the SCI may be a start point of the next symbol of the end symbol of the first time domain resource indicated by the SCI, or an end point of the next symbol of the end symbol of the first time domain resource indicated by the SCI. The end point of the end symbol of the first time domain resource and the start point of the next symbol of the end symbol of the first time domain resource may be a same moment.

In this application, the "start symbol of the time domain resource" may also be referred to as "start of the time domain resource" or a "start moment of the time domain resource". The "end symbol of the time domain resource" may also be referred to as "end of the time domain resource" or an "end moment of the time domain resource". The "start point of the symbol" may also be referred to as a "start moment of the symbol", or "start of the symbol". The "end point of the symbol" may also be referred to as an "end moment of the symbol", or "end of the symbol". The "next symbol of the symbol" may also be referred to as a "next symbol after the symbol", or "after the symbol", or a "first symbol after the symbol". For example, a next symbol of the end symbol may also be referred to as a next symbol after the end symbol, or after the end symbol, or a first symbol after the end symbol.

In some examples, the start symbol of the SCI and the start symbol of the first time domain resource indicated by the SCI are a same moment. In some other examples, the start symbol of the SCI and the start symbol of the first time domain resource indicated by the SCI are not at a same moment, and automatic gain control (AGC) needs one symbol. In practice, the first time domain resource may occupy 14 or 12 symbols. The SCI may occupy one, two, or three symbols, or one, two, or three symbols after AGC. In other words, first-level SCI may occupy one, two, or three symbols, or one, two, or three symbols after AGC. Second-level SCI may occupy one, two, or three symbols. The second-level SCI is located after the first-level SCI. Optionally, the second-level SCI may be immediately followed by the first-level SCI, or may be separated from the first-level SCI by one or more symbols. Whether a frequency domain resource occupies one sub-channel or a part of one sub-channel is not limited.

A start symbol of an $x^{th}$ time domain resource that is in the first resource set and that is indicated by the SCI may be, for example, a start point of the start symbol of the $x^{th}$ time domain resource that is in the first resource set and that is indicated by the SCI, or an end point of the start symbol of the $x^{th}$ time domain resource that is in the first resource set and that is indicated by the SCI.

A next symbol of the start symbol of the $x^{th}$ time domain resource that is in the first resource set and that is indicated by the SCI may be, for example, a start point of the next symbol of the start symbol of the $x^{th}$ time domain resource that is in the first resource set and that is indicated by the SCI, or an end point of the next symbol of the start symbol of the $x^{th}$ time domain resource that is in the first resource set and that is indicated by the SCI.

An end symbol of the $x^{th}$ time domain resource that is in the first resource set and that is indicated by the SCI may be, for example, a start point of the end symbol of the $x^{th}$ time domain resource that is in the first resource set and that is indicated by the SCI, or an end point of the end symbol of the $x^{th}$ time domain resource that is in the first resource set and that is indicated by the SCI.

A next symbol of the end symbol of the $x^{th}$ time domain resource that is in the first resource set and that is indicated by the SCI may be, for example, a start point of the next symbol of the end symbol of the $x^{th}$ time domain resource that is in the first resource set and that is indicated by the SCI, or an end point of the next symbol of the end symbol of the $x^{th}$ time domain resource that is in the first resource set and that is indicated by the SCI.

A start symbol of an $x^{th}$ time domain resource that is in a $y^{th}$ first resource set in a second resource set and that is indicated by the SCI may be, for example, a start point of the start symbol of the $x^{th}$ time domain resource that is in the $y^{th}$ first resource set in the second resource set and that is indicated by the SCI, or an end point of the start symbol of the $x^{th}$ time domain resource that is in the $y^{th}$ first resource set in the second resource set and that is indicated by the SCI.

A next symbol of the start symbol of the $x^{th}$ time domain resource that is in the $y^{th}$ first resource set in the second resource set and that is indicated by the SCI may be, for example, a start point of the next symbol of the start symbol of the $x^{th}$ time domain resource that is in the $y^{th}$ first resource set in the second resource set and that is indicated by the SCI, or an end point of the next symbol of the start symbol of the $x^{th}$ time domain resource that is in the $y^{th}$ first resource set in the second resource set and that is indicated by the SCI.

An end symbol of the $x^{th}$ time domain resource that is in the $y^{th}$ first resource set in the second resource set and that is indicated by the SCI may be, for example, a start point of the end symbol of the $x^{th}$ time domain resource that is in the $y^{th}$ first resource set in the second resource set and that is indicated by the SCI, or an end point of the end symbol of the $x^{th}$ time domain resource that is in the $y^{th}$ first resource set in the second resource set and that is indicated by the SCI.

A next symbol of the end symbol of the $x^{th}$ time domain resource that is in the $y^{th}$ first resource set in the second resource set and that is indicated by the SCI may be, for example, a start point of the next symbol of the end symbol of the $x^{th}$ time domain resource that is in the $y^{th}$ first resource set in the second resource set and that is indicated by the SCI, or an end point of the next symbol of the end symbol of the $x^{th}$ time domain resource that is in the $y^{th}$ first resource set in the second resource set and that is indicated by the SCI.

The rest may be deduced by analogy, and details are not described again.

Figure 12:
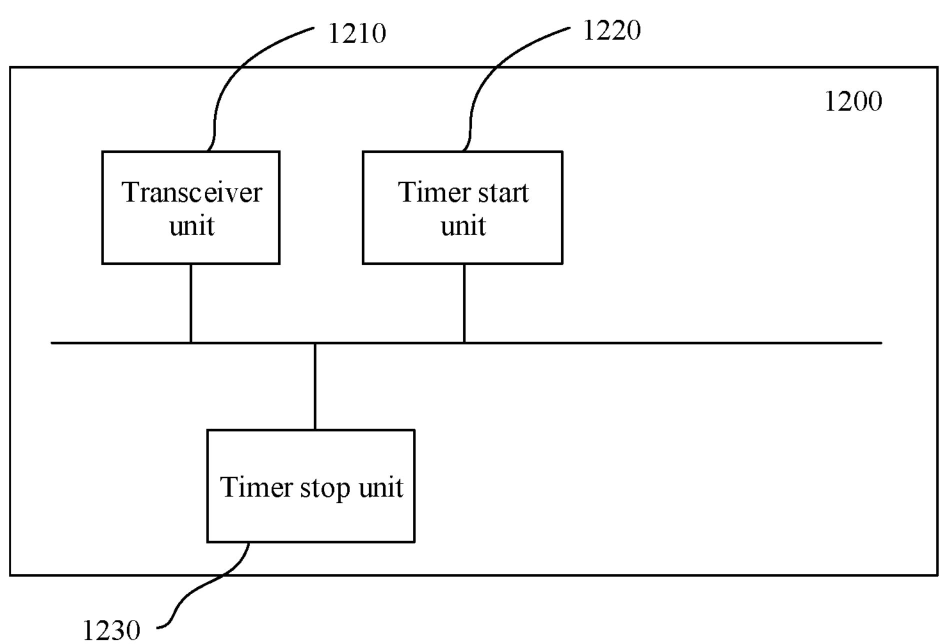
FIG. 12 is a schematic diagram of a communication apparatus, according to an embodiment of the present disclosure.

FIG. 12 is a schematic diagram of a communication apparatus according to an embodiment of this application. The apparatus is configured to implement steps performed by a corresponding terminal (such as a first terminal or a second terminal) in the foregoing method embodiments. As shown in FIG. 12, the apparatus 1200 includes a transceiver unit 1210, a timer start unit 1220, and a timer stop unit 1230.

In a first embodiment:

the transceiver unit 1210 is configured to receive sidelink control information SCI from a second terminal. The SCI indicates a time domain resource of a sidelink. The timer start unit 1220 is configured to start a first timer at a first moment or a second moment. The first moment is associated with a time domain resource that is of a sidelink and that is occupied or indicated by the SCI. The second moment is associated with a time domain resource occupied by feedback information sent by the first terminal. The feedback information includes a measurement report of the sidelink, channel state information CSI of the sidelink, or hybrid automatic repeat request HARQ information of the sidelink. The first timer indicates not to listen to the sidelink control information and/or sidelink data information in at least one time unit after the first timer is started. The timer stop unit 1230 is configured to stop the first timer at a third moment or a fourth moment. The third moment is obtained based on first duration. The first duration is associated with latency that is of a time domain resource used for sidelink transmission and that is obtained by the second terminal. The fourth moment is associated with the time domain resource that is of the sidelink and that is indicated by the SCI.

In a possible implementation, the first moment is any one of the following:

a start symbol of the SCI;

a next symbol of the start symbol of the SCI;

an end symbol of the SCI;

a next symbol of the end symbol of the SCI;

a start symbol of a first time domain resource indicated by the SCI;

a next symbol of the start symbol of the first time domain resource indicated by the SCI;

an end symbol of the first time domain resource indicated by the SCI;

a next symbol of the end symbol of the first time domain resource indicated by the SCI; and the end symbol of the first time domain resource indicated by the SCI plus a first offset.

In a possible implementation, the first offset is configured by using radio resource control RRC signaling, and the RRC signaling is PC5 RRC signaling or RRC signaling from a network device.

In a possible implementation, the second moment is any one of the following:

an end moment of the feedback information;

a next symbol of a symbol occupied by the feedback information;

the symbol occupied by the feedback information plus a second offset;

a next slot of the time domain resource occupied by the feedback information; and a next slot of a slot occupied by the feedback information.

In a possible implementation, the second offset is configured by using RRC signaling, and the RRC signaling is PC5 RRC signaling or RRC signaling from a network device.

In a possible implementation, the first duration is as follows:

T1, T2, T1+T3, T4, T1+T4, T2+T4, T1+T3+T4, T5, T5+T4, T5+T1, or T5+T1+T4.

T1 is duration used by the second terminal to complete a resource detection and selection process. T2 is duration used by the second terminal to identify a candidate resource and select a resource used for sidelink transmission. T3 is latency in processing the feedback information by the second terminal. T4 is a delay of a resource selection window of the second terminal relative to a resource detection window of the second terminal. T5 is duration in which the second terminal completes SCI decoding/parsing, or duration in which the second terminal completes SCI decoding/parsing and performs reference signal received power RSRP/received signal strength indication RSSI measurement.

In a possible implementation, the time domain resource that is of the sidelink and that is indicated by the SCI includes a first resource set. The first resource set includes time domain resources of N sidelinks. N is a positive integer. The fourth moment is a fifth moment, the fifth moment plus a third offset, a sum of the first moment and duration corresponding to a first difference, or a sum of the second moment and duration corresponding to a second difference. The first difference is a difference between the first moment and the fifth moment. The second difference is a difference between the second moment and the fifth moment.

The fifth moment is any one of the following:

a start symbol of an $x^{th}$ time domain resource that is in the first resource set and that is indicated by the SCI;

a next symbol of the start symbol of the $x^{th}$ time domain resource that is in the first resource set and that is indicated by the SCI;

an end symbol of the $x^{th}$ time domain resource that is in the first resource set and that is indicated by the SCI; and a next symbol of the end symbol of the $x^{th}$ time domain resource that is in the first resource set and that is indicated by the SCI.

x is an integer less than or equal to N and greater than 1.

In a possible implementation, the time domain resource that is of the sidelink and that is indicated by the SCI includes a second resource set. The second resource set includes a periodic first resource set. The first resource set includes time domain resources of N sidelinks. N is a positive integer. The fourth moment is a sixth moment, the sixth moment plus a fourth offset, a sum of the first moment and duration corresponding to a third difference, or a sum of the second moment and duration corresponding to a fourth difference. The third difference is a difference between the first moment and the sixth moment. The fourth difference is a difference between the second moment and the sixth moment. The sixth moment is any one of the following:

a start symbol of a $z^{th}$ time domain resource that is in a $y^{th}$ first resource set in the second resource set and that is indicated by the SCI;

a next symbol of the start symbol of the $z^{th}$ time domain resource that is in the $y^{th}$ first resource set in the second resource set and that is indicated by the SCI;

an end symbol of the $z^{th}$ time domain resource that is in the $y^{th}$ first resource set in the second resource set and that is indicated by the SCI; and a next symbol of the end symbol of the $z^{th}$ time domain resource that is in the $y^{th}$ first resource set in the second resource set and that is indicated by the SCI.

y is a positive integer, and z is a positive integer less than or equal to N.

In a possible implementation, the SCI includes first-level SCI and second-level SCI. The first moment is any one of the following:

a start symbol of the first-level SCI or a start symbol of the second-level SCI;

a next symbol of the start symbol of the first-level SCI or a next symbol of the start symbol of the second-level SCI;

an end symbol of the first-level SCI or an end symbol of the second-level SCI;

a next symbol of the end symbol of the first-level SCI or a next symbol of the end symbol of the second-level SCI;

a start symbol of a first time domain resource indicated by the first-level SCI;

a next symbol of the start symbol of the first time domain resource indicated by the first-level SCI;

an end symbol of the first time domain resource indicated by the first-level SCI; and a next symbol of the end symbol of the first time domain resource indicated by the first-level SCI.

In a possible implementation, the first-level SCI indicates a first resource set. The first resource set includes time domain resources of N sidelinks. N is a positive integer. The fourth moment is any one of the following:

a start symbol of an $x^{th}$ time domain resource in the first resource set;

a next symbol of the start symbol of the $x^{th}$ time domain resource in the first resource set;

an end symbol of the $x^{th}$ time domain resource in the first resource set; and a next symbol of the end symbol of the $x^{th}$ time domain resource in the first resource set.

x is an integer less than or equal to N and greater than 1.

In a possible implementation, the first-level SCI indicates a second resource set. The second resource set includes a periodic first resource set. The first resource set includes time domain resources of N sidelinks. N is a positive integer. The fourth moment is any one of the following: a start symbol of a $z^{th}$ time domain resource in a $y^{th}$ first resource set in the second resource set;

a next symbol of the start symbol of the $z^{th}$ time domain resource in the $y^{th}$ first resource set in the second resource set;

an end symbol of the $z^{th}$ time domain resource in the $y^{th}$ first resource set in the second resource set; and a next symbol of the end symbol of the $z^{th}$ time domain resource in the $y^{th}$ first resource set in the second resource set, where y is a positive integer, and z is a positive integer less than or equal to N.

In a possible implementation, the timer start unit 1220 is further configured to start a second timer at a seventh moment. The seventh moment is a stop moment of the first timer or a first symbol after the stop moment of the first timer.

In a possible implementation, the timer stop unit 1230 is further configured to stop the second timer at an eighth moment. The eighth moment is obtained based on second duration. The second duration is configured by using RRC signaling, or is a duration value associated with duration of a resource selection window, or is a duration value associated with duration of resource selection/reselection.

In a possible implementation, the feedback information is the measurement report of the sidelink or the CSI of the sidelink, and the second timer indicates a time period for listening to the sidelink control information and/or the sidelink data information.

In a possible implementation, the feedback information is the HARQ information, and the second timer indicates a time period for listening to retransmitted data on the sidelink.

In a second embodiment:

a transceiver unit 1210 is configured to send sidelink control information SCI to a first terminal. The SCI indicates a time domain resource of a sidelink. A timer start unit 1220 is configured to start a first timer at a first moment. The first moment is associated with a time domain resource that is of a sidelink and that is occupied or indicated by the SCI. The first timer indicates not to listen to feedback information in at least one time unit after the first timer is started. A timer stop unit 1230 is configured to stop the first timer at a second moment. The second moment is associated with a time domain resource occupied by the feedback information sent by the first terminal. The feedback information includes a measurement report of the sidelink, channel state information CSI of the sidelink, or hybrid automatic repeat request HARQ information of the sidelink.

In a possible implementation, the first moment is any one of the following:

a start symbol of the SCI;

a next symbol of the start symbol of the SCI;

an end symbol of the SCI;

a next symbol of the end symbol of the SCI;

a start symbol of a first time domain resource indicated by the SCI;

a next symbol of the start symbol of the first time domain resource indicated by the SCI;

an end symbol of the first time domain resource indicated by the SCI;

a next symbol of the end symbol of the first time domain resource indicated by the SCI; and the end symbol of the first time domain resource indicated by the SCI plus a first offset.

In a possible implementation, the first offset is configured by using radio resource control RRC signaling, and the RRC signaling is PC5 RRC signaling or RRC signaling from a network device.

In a possible implementation, the second moment is any one of the following:

a start moment of the feedback information;

a previous symbol of a symbol occupied by the feedback information;

the symbol occupied by the feedback information minus a second offset;

a previous slot of the time domain resource occupied by the feedback information; and a previous slot of a slot occupied by the feedback information.

In a possible implementation, the second offset is configured by using RRC signaling, and the RRC signaling is PC5 RRC signaling or RRC signaling from a network device.

In a possible implementation, the timer start unit 1220 is further configured to start a second timer at a third moment. The third moment is a stop moment of the first timer or a first symbol after the stop moment of the first timer. The second timer indicates a time period for listening to the feedback information.

In a possible implementation, the timer stop unit 1230 is further configured to stop the second timer at a fourth moment. The fourth moment is a value preconfigured or predefined by the network device or the second terminal.

It may be understood that the foregoing units may also be referred to as modules, circuits, or the like, and the foregoing units may be independently disposed, or may be all or partially integrated.

Optionally, the communication apparatus 1200 may further include a storage unit. The storage unit is configured to store data or instructions (which may also be referred to as code or a program). The foregoing units may interact with or be coupled to the storage unit, to implement a corresponding method or function. For example, the timer start unit 1220 and the timer stop unit 1230 may read data or instructions in the storage unit, to enable the communication apparatus to implement the method in the foregoing embodiment.

It should be understood that division of the foregoing apparatus into the units is merely logical function division. In an actual implementation, all or some of the units may be integrated into a physical entity, or may be physically separate. In addition, all the units in the apparatus may be implemented in a form of software invoked by a processing element, or may be implemented in a form of hardware; or some units may be implemented in a form of software invoked by a processing element, and some units may be implemented in a form of hardware. For example, the units may be separately disposed processing elements, or may be integrated into a chip of the apparatus for implementation. In addition, the units may be stored in a memory in a program form, and is invoked by a processing element of the apparatus to perform functions of the units. In addition, all or some of the units may be integrated together, or may be implemented independently. The processing element herein may also be referred to as a processor, and may be an integrated circuit having a signal processing capability. In an implementation process, the steps in the foregoing methods or the foregoing units may be implemented by using an integrated logic circuit of hardware in the processor element, or may be implemented in a form of software invoked by the processing element.

For example, a unit in any one of the foregoing apparatuses may be one or more integrated circuits configured to implement the foregoing method, for example, one or more application-specific integrated circuits (ASIC), one or more microprocessors (e.g., digital signal processor, DSP), one or more field programmable gate arrays (FPGA), or a combination of at least two of the integrated circuits. For another example, when the units in the apparatus may be implemented in a form of a program invoked by a processing element, the processing element may be a general-purpose processor, for example, a central processing unit (CPU) or another processor that can invoke the program. For still another example, the units may be integrated and implemented in a form of a system-on-a-chip (SOC).

The foregoing unit (for example, a receiving unit) for receiving is an interface circuit of the apparatus, and is configured to receive a signal from another apparatus. For example, when the apparatus is implemented in a manner of a chip, the receiving unit is an interface circuit that is of the chip and that is configured to receive a signal from another chip or apparatus. The foregoing unit (for example, a sending unit) for sending is an interface circuit of the apparatus, and is configured to send a signal to another apparatus. For example, when the apparatus is implemented in a manner of a chip, the sending unit is an interface circuit that is of the chip and that is configured to send a signal to another chip or apparatus.

Figure 13:
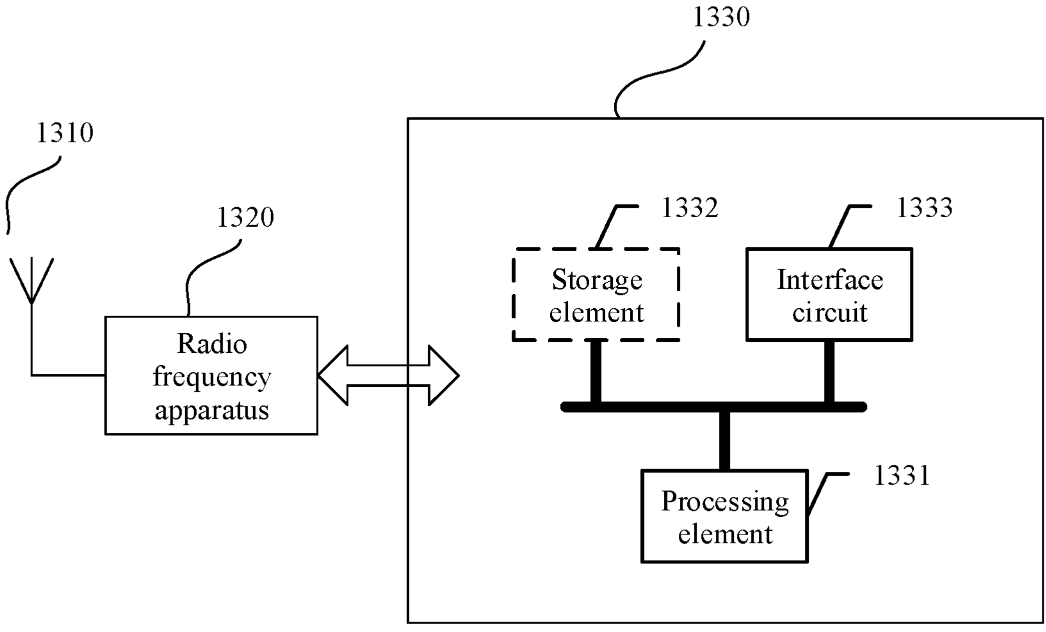
FIG. 13 is a schematic diagram of a terminal, according to an embodiment of the present disclosure.

FIG. 13 is a schematic diagram of a structure of a terminal according to an embodiment of this application. The terminal is configured to implement operations of the terminal (for example, the first terminal or the second terminal) in the foregoing embodiments. As shown in FIG. 13, the terminal includes an antenna 1310, a radio frequency apparatus 1320, and a signal processing part 1330. The antenna 1310 is connected to the radio frequency apparatus 1320. In a downlink direction, the radio frequency apparatus 1320 receives, by using the antenna 1310, information sent by a network device or another terminal, and sends, to the signal processing part 1330 for processing, the information sent by the network device or the another terminal. In an uplink direction, the signal processing part 1330 processes information of the terminal, and sends the information to the radio frequency apparatus 1320. The radio frequency apparatus 1320 processes the information of the terminal, and then sends the processed information to the network device or another terminal by using the antenna 1310.

The signal processing part 1330 is configured to implement processing on each communication protocol layer of data. The signal processing part 1330 may be a subsystem of the terminal. The terminal may further include another subsystem, for example, a central processing subsystem, configured to process an operating system and an application layer of the terminal. For another example, a peripheral subsystem is configured to connect to another device. The signal processing part 1330 may be a separately disposed chip. Optionally, the foregoing apparatus may be located in the signal processing part 1330.

The signal processing part 1330 may include one or more processing elements 1331, for example, include a main control CPU and another integrated circuit, and include an interface circuit 1333. In addition, the signal processing part 1330 may further include a storage element 1332. The storage element 1332 is configured to store data and a program. The program used to perform the method performed by the terminal in the foregoing methods may be stored in the storage element 1332, or may not be stored in the storage element 1332. For example, stored in a memory outside the signal processing part 1330. When used, the signal processing part 1330 loads the program into a cache for use. The interface circuit 1333 is configured to communicate with the apparatus. The foregoing apparatus may be located in the signal processing part 1330. The signal processing part 1330 may be implemented by using a chip. The chip includes at least one processing element and an interface circuit. The processing element is configured to perform steps of any method performed by the foregoing terminal. The interface circuit is configured to communicate with another apparatus. In an implementation, units for implementing the steps in the foregoing methods may be implemented in a form of a program invoked by a processing element. For example, the apparatus includes a processing element and a storage element, and the processing element invokes a program stored in the storage element, to perform the method performed by the terminal in the foregoing method embodiments. The storage element may be a storage element located on a same chip as the processing element, that is, an on-chip storage element.

In another implementation, a program used to perform the method performed by the terminal in the foregoing methods may be in a storage element located on a different chip from the processing element, namely, an off-chip storage element. In this case, the processing element invokes or loads the program from the off-chip storage element to the on-chip storage element, to invoke and perform the methods performed by the terminal in the foregoing method embodiment.

In still another implementation, a unit in the terminal for implementing the steps in the foregoing methods may be configured as one or more processing elements. These processing elements are disposed on the signal processing part 1330. The processing element herein may be an integrated circuit, for example, one or more ASICs, one or more DSPs, one or more FPGAs, or a combination of these integrated circuits. These integrated circuits may be integrated together to form a chip.

The units for implementing the steps in the foregoing methods may be integrated together and implemented in a form of a system-on-a-chip (SOC). The SOC chip is configured to implement the foregoing methods. At least one processing element and a storage element may be integrated into the chip, and the processing element invokes a program stored in the storage element to implement the foregoing methods performed by the terminal. Alternatively, at least one integrated circuit may be integrated into the chip, to implement the foregoing methods performed by the terminal. Alternatively, with reference to the foregoing implementations, functions of some units may be implemented by invoking a program by the processing element, and functions of some units may be implemented by the integrated circuit.

It can be learned that the foregoing apparatus may include at least one processing element and an interface circuit, and the at least one processing element is configured to perform any method performed by the terminal provided in the foregoing method embodiments. The processing element may perform some or all steps performed by the terminal in a first manner, that is, by invoking a program stored in the storage element; or may perform some or all steps performed by the terminal in a second manner, that is, by combining instructions and an integrated logic circuit of hardware in the processor element. Certainly, some or all steps performed by the terminal may be alternatively performed by combining the first manner and the second manner.

As described above, the processing element herein may be a general-purpose processor, for example, a CPU, or may be one or more integrated circuits configured to implement the foregoing methods, for example, one or more ASICs, one or more microprocessors DSPs, one or more FPGAs, or a combination of at least two of the integrated circuits. The storage element may be one memory, or may be a general term of a plurality of storage elements.

A person of ordinary skill in the art may understand that first, second, third, fourth, and various reference numerals in this application are merely distinguished for convenient description, and are not used to limit a scope of embodiments of this application, and also indicate a sequence. The term "and/or" describes an association relationship for describing associated objects and represents that three relationships may exist. For example, A and/or B may represent the following three cases: Only A exists, both A and B exist, and only B exists. The character "/" generally indicates an "or" relationship between the associated objects. The term "at least one" means one or more. At least two means two or more. "At least one", "any one", or a similar expression thereof means any combination of the items, including a singular item (piece) or any combination of plural items (pieces). For example, at least one (piece, or type) of a, b, or c may represent: a, b, c, a and b, a and c, b and c, or a, b, and c, where a, b, and c may be singular or plural. The term "a plurality of" indicates two or more, and another quantifier is similar to this.

It should be understood that sequence numbers of the foregoing processes do not mean execution sequences in various embodiments of this application. The execution sequences of the processes should be determined according to functions and internal logic of the processes, and should not be construed as any limitation on the implementation processes of embodiments of the present disclosure.

A person skilled in the art may clearly understand that, for the purpose of convenient and brief description, for detailed working processes of the foregoing system, apparatus, and unit, refer to corresponding processes in the foregoing method embodiments. Details are not described herein again.

In the several embodiments provided in this application, it should be understood that the disclosed system, apparatus, and method may be implemented in other manners. For example, the foregoing apparatus embodiments are merely examples. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected to achieve exemplary embodiments of this disclosure.

In addition, functional units in embodiments of this application may be integrated into one processing unit, each of the units may exist alone physically, or two or more units may be integrated into one unit.

All or some of the foregoing embodiments may be implemented by using software, hardware, firmware, or any combination thereof. When software is used to implement the embodiments, all or a part of the embodiments may be implemented in a form of a computer program product. The computer program product includes one or more computer instructions. When the computer program instructions are loaded and executed on the computer, the procedure or functions according to embodiments of this application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid state disk (SSD)), or the like.

The various illustrative logical units and circuits described in embodiments of this application may implement or operate the described functions by using a general purpose processor, a digital signal processor, an application-specific integrated circuit (ASIC), a field programmable gate array (FPGA) or another programmable logical apparatus, a discrete gate or transistor logic, a discrete hardware component, or a design of any combination thereof. The general-purpose processor may be a microprocessor. Optionally, the general-purpose processor may also be any conventional processor, controller, microcontroller, or state machine. The processor may also be implemented by a combination of computing apparatuses, such as a digital signal processor and a microprocessor, multiple microprocessors, one or more microprocessors with a digital signal processor core, or any other similar configuration.

Steps of the methods or algorithms described in embodiments of this application may be directly embedded into hardware, a software unit executed by a processor, or a combination thereof. The software unit may be stored in a random access memory (RAM), a flash memory, a read-only memory (ROM), an EPROM memory, an EEPROM memory, a register, a hard disk, a removable magnetic disk, a CD-ROM, or a storage medium of any other form in the art. For example, the storage medium may connect to a processor so that the processor may read information from the storage medium and write information to the storage medium. Alternatively, the storage medium may be integrated into a processor. The processor and the storage medium may be disposed in the ASIC.

These computer program instructions may also be loaded onto a computer or another programmable data processing device, so that a series of operations and steps are performed on the computer or the another programmable device, thereby generating computer-implemented processing. Therefore, the instructions executed on the computer or the another programmable device provide steps for implementing a function in one or more processes in the flowcharts and/or in one or more blocks in the block diagrams.

A person skilled in the art should be aware that in the foregoing one or more examples, functions described in this application may be implemented by hardware, software, firmware, or any combination thereof. When the functions are implemented by software, the foregoing functions may be stored in a computer-readable medium or transmitted as one or more instructions or code in a computer-readable medium. The computer-readable medium includes a computer storage medium and a communication medium, where the communication medium includes any medium that enables a computer program to be transmitted from one place to another. The storage medium may be any available medium accessible to a general-purpose or a special-purpose computer.

Although this application is described with reference to features and embodiments thereof, it is clear that various modifications and combinations may be made to them without departing from the spirit and scope of this application. Correspondingly, the specification and accompanying drawings are merely example description of this application defined by the accompanying claims, and are considered as any of or all modifications, variations, combinations or equivalents that cover the scope of this application. It is clearly that, a person skilled in the art can make various modifications and variations to this application without departing from the scope of this application. This application is intended to cover these modifications and variations of this application provided that they fall within the scope of protection defined by the following claims and their equivalent technologies.

What is claimed is:

1. A communication method, performed by a first terminal or a chip of the first terminal, wherein the method comprises:

receiving sidelink control information (SCI) from a second terminal, wherein the SCI indicates a time domain resource of a sidelink; and starting a first timer, based on a time domain resource occupied by feedback information sent by the first terminal, the feedback information comprising a measurement report of the sidelink, channel state information (CSI) of the sidelink, or hybrid automatic repeat request (HARQ) information of the sidelink, and wherein the first terminal does not listen to the at least one sidelink control information and sidelink data information for a first duration of at least one time unit after the first timer is started, wherein the time domain resource that is of the sidelink and that is indicated by the SCI comprises a first resource set, the first resource set comprises time domain resources of N sidelinks, and N is a positive integer greater than or equal to 2; and the first duration is associated with a start moment of an xth time domain resource that is in the first resource set and that is indicated by the SCI, wherein x is an integer less than or equal to N and greater than 1, the first time domain resource that is in the first resource set and that is indicated by the SCI is used for initial transmission of sidelink data, and the $x^{th}$ time domain resource that is in the first resource set and that is indicated by the SCI is used for retransmission of the sidelink data.

2. The method according to claim 1, wherein when one of a first duration is met or when the first duration is exceeded, stopping, by the first terminal, the first timer.

3. The method according to claim 2, wherein the first duration is configured for the first terminal by using RRC signaling.

4. The method according to claim 1, wherein the time domain resource used for sidelink transmission includes at least one of a time domain resource used for initial transmission of the sidelink transmission and/or a time domain resource used for retransmission of the sidelink transmission.

5. The method according to claim 1, wherein the start moment of the first timer is a symbol occupied by the feedback information plus a second offset.

6. The method according to claim 1, wherein when the time domain resource that is of the sidelink and that is indicated by the SCI is one time domain resource, the first duration is configured using RRC signaling.

7. A first terminal comprising:

a processor; and a non-transitory memory storing instructions, that when executed by the processor cause the first terminal to perform steps comprising:

receiving sidelink control information (SCI) from a second terminal, wherein the SCI indicates a time domain resource of a sidelink; and starting a first timer, based on a time domain resource occupied by feedback information sent by the first terminal, the feedback information comprising a measurement report of the sidelink, channel state information (CSI) of the sidelink, or hybrid automatic repeat request (HARQ) information of the sidelink, and wherein the first terminal does not listen to the at least one sidelink control information and sidelink data information for a first duration of at least one time unit after the first timer is started, wherein the time domain resource that is of the sidelink and that is indicated by the SCI comprises a first resource set, the first resource set comprises time domain resources of N sidelinks, and N is a positive integer greater than or equal to 2; and the first duration is associated with a start moment of an xth time domain resource that is in the first resource set and that is indicated by the SCI, wherein x is an integer less than or equal to N and greater than 1, the first time domain resource that is in the first resource set and that is indicated by the SCI is used for initial transmission of sidelink data, and the xth time domain resource that is in the first resource set and that is indicated by the SCI is used for retransmission of the sidelink data.

8. The first terminal according to claim 7, wherein when one of a first duration is met or when the first duration is exceeded, stopping, by the first terminal, the first timer.

9. The first terminal according to claim 8, wherein the first duration is configured for the first terminal by using RRC signaling.

10. The first terminal according to claim 7, wherein the time domain resource used for sidelink transmission includes at least one of a time domain resource used for initial transmission of the sidelink transmission and/or a time domain resource used for retransmission of the sidelink transmission.

11. The first terminal according to claim 7, wherein the start moment of the first timer is a symbol occupied by the feedback information plus a second offset.

12. The first terminal according to claim 7, wherein when the time domain resource that is of the sidelink and that is indicated by the SCI is one time domain resource, the first duration is configured using RRC signaling.

13. A non-transitory memory storing instructions, that when executed by a processor cause a first terminal to perform steps comprising:

receiving sidelink control information (SCI) from a second terminal, wherein the SCI indicates a time domain resource of a sidelink; and starting a first timer, based on a time domain resource occupied by feedback information sent by the first terminal, the feedback information comprising a measurement report of the sidelink, channel state information (CSI) of the sidelink, or hybrid automatic repeat request (HARQ) information of the sidelink, and wherein the first terminal does not listen to the at least one sidelink control information and sidelink data information for a first duration of at least one time unit after the first timer is started, wherein the time domain resource that is of the sidelink and that is indicated by the SCI comprises a first resource set, the first resource set comprises time domain resources of N sidelinks, and N is a positive integer greater than or equal to 2; and the first duration is associated with a start moment of an xth time domain resource that is in the first resource set and that is indicated by the SCI, wherein x is an integer less than or equal to N and greater than 1, the first time domain resource that is in the first resource set and that is indicated by the SCI is used for initial transmission of sidelink data, and the xth time domain resource that is in the first resource set and that is indicated by the SCI is used for retransmission of the sidelink data.

14. The non-transitory memory storing instructions according to claim 13, wherein when one of a first duration is met or when the first duration is exceeded, stopping, by the first terminal, the first timer.

15. The non-transitory memory storing instructions according to claim 14, wherein the first duration is configured for the first terminal by using RRC signaling.

16. The non-transitory memory according to claim 13, wherein when the time domain resource that is of the sidelink and that is indicated by the SCI is one time domain resource, the first duration is configured using RRC signaling.

17. The non-transitory memory according to claim 13, wherein the start moment of the first timer is a symbol occupied by the feedback information plus a second offset.

* * * * *